US009110581B2

(12) United States Patent
Momchilov

(10) Patent No.: US 9,110,581 B2
(45) Date of Patent: Aug. 18, 2015

(54) TOUCH SUPPORT FOR REMOTED APPLICATIONS

(75) Inventor: Georgy Momchilov, Coconut Creek, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 687 days.

(21) Appl. No.: 13/253,452

(22) Filed: Oct. 5, 2011

(65) Prior Publication Data

US 2012/0092277 A1    Apr. 19, 2012

Related U.S. Application Data

(60) Provisional application No. 61/389,874, filed on Oct. 5, 2010.

(51) Int. Cl.
| | | |
|---|---|---|
| *G09G 5/00* | (2006.01) | |
| *G06F 3/041* | (2006.01) | |
| *G06F 3/02* | (2006.01) | |
| *G06F 3/00* | (2006.01) | |
| *G06F 3/0488* | (2013.01) | |
| *G06F 3/038* | (2013.01) | |
| *G06F 9/44* | (2006.01) | |

(52) U.S. Cl.
CPC .............. *G06F 3/0488* (2013.01); *G06F 3/038* (2013.01); *G06F 3/04886* (2013.01); *G06F 9/4443* (2013.01)

(58) Field of Classification Search
USPC ........................... 345/173, 156, 169; 715/753
See application file for complete search history.

(56) References Cited

U.S. PATENT DOCUMENTS

| | | | | |
|---|---|---|---|---|
| 7,562,226 | B2 * | 7/2009 | Aiken et al. ................... | 713/182 |
| 7,624,192 | B2 * | 11/2009 | Meyers et al. ................ | 709/238 |
| 7,870,496 | B1 * | 1/2011 | Sherwani ....................... | 715/761 |
| 8,069,226 | B2 * | 11/2011 | Momchilov et al. .......... | 709/219 |
| 2004/0133428 | A1 * | 7/2004 | Brittan et al. ................. | 704/276 |
| 2005/0185364 | A1 * | 8/2005 | Bell et al. ....................... | 361/679 |
| 2009/0125824 | A1 * | 5/2009 | Andrews et al. .............. | 715/764 |
| 2009/0140986 | A1 * | 6/2009 | Karkkainen et al. .......... | 345/173 |

(Continued)

OTHER PUBLICATIONS

International Search Report and Written Opinion for application No. PCT/US11/54934 mailed Feb. 28, 2012.

(Continued)

*Primary Examiner* — Temesgh Ghebretinsae
*Assistant Examiner* — Benyam Ketema
(74) *Attorney, Agent, or Firm* — Banner & Witcoff, Ltd.

(57) ABSTRACT

Touch, multi-touch, gesture, flick and stylus pen input may be supported for remoted applications. For example, a touch capable client device may receive touch input for a remoted application executing on a server. In such an instance, the touch input may be transmitted to the server for processing. The server may modify the application display or the application functionality and provide an output to the client device. In some arrangements, the output may correspond to instructions for modifying a display of the application while in other examples, the output may correspond to an image of the changed application display. Additionally or alternatively, determining a functionality associated with touch input may be performed based on user definitions, user preferences, server definitions (e.g., operating system on the server), client definitions (e.g., operating system on the client) and the like and/or combinations thereof. Aspects may also include resolving latency and enhancing user experience.

19 Claims, 25 Drawing Sheets

(56) References Cited

U.S. PATENT DOCUMENTS

| | | | |
|---|---|---|---|
| 2009/0247136 A1* | 10/2009 | Srinivasan et al. | 455/414.2 |
| 2009/0292989 A1* | 11/2009 | Matthews et al. | 715/702 |
| 2010/0214243 A1 | 8/2010 | Birnbaum et al. | |
| 2010/0313143 A1* | 12/2010 | Jung et al. | 715/753 |
| 2011/0154228 A1* | 6/2011 | Kinoshita | 715/763 |
| 2012/0044157 A1* | 2/2012 | Chen | 345/173 |

OTHER PUBLICATIONS

"Nebulas Solutions Launches "VDI in a Box" to Cut the Cost, Time and Complexity of Deploying Virtual Desktop Infrastructures", Aug. 4, 2009.

\* cited by examiner

TOUCH SUPPORT FOR REMOTED APPLICATIONS

CROSS-REFERENCE TO RELATED APPLICATION

This application claims the benefit of priority from U.S. Provisional Application No. 61/389,874, entitled "MULTI-TOUCH SUPPORT FOR REMOTE APPLICATIONS," filed Oct. 5, 2010. The content of the above-noted application is hereby incorporated by reference in its entirety.

TECHNICAL FIELD

Aspects described herein generally relate to supporting touch input in an application. For example, aspects relate to providing touch input support for remoted applications.

BACKGROUND

Devices, both stationary and mobile, may provide touch support for applications and operating systems executing thereon. Additionally or alternatively, applications and operating systems may be touch-compatible or incompatible with touch input. In some arrangements, the applications may be remoted applications that are executed on a server device. The remoted applications may allow interactions by a user through a client device without requiring the client device to store or execute the application. Instead, the client device may receive application output and data from the server device and display the application output on the local display.

In some instances, the client device may be touch input compatible and thus, a user may wish to control the application using touch input. Because the application is executed at the server device, touch input directed to the application may be passed to the server for appropriate processing in the context of the application. However, in some arrangements, touch input may be handled in a proprietary or private manner according to an underlying operating system. For example, touch input data may be stored in a non-public memory area that might only be accessible by the operating system or functions thereof. An application may retrieve the touch input data by calling functions provided by the operating system. Accordingly, in some examples, passing touch input events from one device to another device may cause processing obstacles due to a potential inability to store the touch input data in the non-public memory areas of the operating system and retrieve the data using the operating system functions.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

According to one or more aspects, touch, multi-touch, flick, stylus pen input and gestures may be supported in remoted applications by providing the touch input data to the server executing the remoted application. In one example, the server may provide hooks that detect execution of a first function call intended to retrieve touch input data from private address spaces and to replace the first function call with a second function call to a public address space. In another example, the server may simulate or generate touch input events using a driver configured to access private address spaces of the operating system and store touch input data therein. In yet another example, on some server operating systems, the server may simulate or generate touch input events using an API designed for input injection. In some arrangements, the touch, multi-touch, gesture, flick and stylus pen support may be provided for applications remoted from one local device (e.g., a tablet or phone) to another local device (e.g., another tablet, PC or other device having a larger screen for input and viewing).

According to another aspect, touch input may be supported for legacy applications by converting the touch input into mouse events.

According to yet another aspect, touch input may be processed locally by the client or remotely by the server for a remoted application depending on a variety of factors. In one example, if latency is above a specified threshold, touch input may be processed locally. In another example, a user, application, server, client device or other entity may specify where touch input is to be processed.

According to another aspect, touch input may be translated into different functions depending on various factors including an operating system of the client device, an operating system of the server, user preferences, application requirements, and the like, and/or combinations thereof.

According to still other aspects, applications may be input-type or input-source aware. Accordingly, even if the application is not compatible with touch input, if the input event originates from a touch-input device, the application may modify its display or interface or execute a function differently than if the input event originated from a non-touch input device.

Aspects described herein also include support for flick commands. Flick commands may be self-contained events, e.g., events that do not reference an address space on the device. The self-contained events may store the touch input data including coordinates, direction, pressure, etc. within the notification message. Touch or gesture input data may further include support for stylus/pen input. For example, the touch or gesture input data may include coordinates, orientation, pressure (e.g., of the pen or stylus on the touch sensitive surface) and the like.

According to some aspects, a method for providing a shared session environment may be provided. The method may include facilitating the establishment of a first connection with a first remote computing device to provide access to a shared session window to the first device and facilitating the establishment of a second connection with a second remote computing device to provide access to the shared session window to the second device. The method may further include negotiating gesture capabilities with the first and second remote computing devices, receiving via the first connection data corresponding to a first gesture inputted at the shared session window displayed at the first device to interact with the shared session window and receiving via the second connection data corresponding to a second gesture inputted at the shared session window displayed at the second device to interact with the shared session window. Additionally, the method may include reconciling the data corresponding to the first and second gestures to generate a modification instruction representing the operations defined by the interactions with the shared session windows at the first and second remote computing devices, and transmitting a modified shared session window over the first and second connections to the first and second computing devices.

In some arrangements, the method may further include obtaining a first normalization timestamp from the first device and a second normalization timestamp from the second device, wherein the reconciliation step may include aligning a timestamp of the received first gesture based on the first normalization timestamp, and aligning a timestamp of the received second gesture based on the second normalization timestamp. Additionally, the reconciling step may include employing a mapping table that maps the data corresponding to the first gesture to a first shared session command and that maps the data corresponding to the second gesture to a second shared session command and/or formatting the raw multi-touch information into a format compatible with the shared session window. The formatting, in some instances, may account for the negotiated gesture capabilities for the first remote computing device. In some examples, the first connection may include a screen sharing channel and a first input channel and the second connection may include the screen sharing channel and a second input channel. Moreover, the data corresponding to the first gesture may include raw multi-touch information. In yet other examples, the reconciliation step may include queuing, tossing, and/or coalescing the first and/or second gestures in low-bandwidth network conditions. Still further, the reconciling step may include, determining a difference in time of receipt between the first and second gesture; and discarding one of the first and second gesture in response to determining that the difference in time is lower than a threshold amount of time.

According to still further aspects, the negotiating step may include aggregating the capabilities of the first and second remote computing devices. Aggregating capabilities may, for example, include summing the number of touch inputs the first remote computing device is capable of receiving and the number of touch inputs the second remote computing device is capable of receiving.

According to other aspects, the data corresponding to the first gesture may be formatted for interpretation through processing of raw multi-touch information at the first remote computing device. In some examples, the data corresponding to the first gesture may correspond to a flick and/or a stylus event coming from a pen or finger touch.

According to yet other aspects, a method for providing a shared session environment may include facilitating the establishment of a first connection with a first remote computing device to provide access to a shared session window to the first device, facilitating the establishment of a second connection with a second remote computing device to provide access to the shared session window to the second device, negotiating gesture capabilities with the first remote computing device, and receiving via the first connection data corresponding to a gesture inputted at the shared session window displayed at the first device to interact with the shared session window. Additionally, the method may include receiving via the second connection data corresponding to a non-gesture inputted at the shared session window displayed at the second device to interact with the shared session window, reconciling the data corresponding to the gesture and non-gesture to generate a modification instruction representing the operations defined by the interactions with the shared session windows at the first and second remote computing devices, and transmitting a modified shared session window over the first and second connections to the first and second computing devices. For example, the non-gesture may correspond to a mouse-click or a keyboard entry and the data corresponding to the first gesture may correspond to raw multi-touch information. In a particular example, the first gesture may be a flick or may be a stylus event coming from a pen or finger touch. The method may further include obtaining a first normalization timestamp from the first device and a second normalization timestamp from the second device, wherein the reconciliation step includes aligning a timestamp of the received gesture based on the first normalization timestamp, and aligning a timestamp of the received non-gesture based on the second normalization timestamp. The reconciling step may, alternatively or additionally, include employing a mapping table that maps the data corresponding to the gesture to a first shared session command and that maps the data corresponding to the non-gesture to a second shared session command. In some examples, the reconciling step may include formatting the raw multi-touch information into a format compatible with the shared session window and may account for the negotiated gesture capabilities for the first remote computing device. Still further, the reconciling step may include queuing, tossing, and/or coalescing the first and/or second gestures in low-bandwidth network conditions.

According to another aspect, the first connection comprises a screen sharing channel and a first input channel and the second connection comprises the screen sharing channel and a second input channel. Additionally or alternatively, the negotiation may include aggregating the capabilities of the first and second remote computing devices. For example, aggregating the capabilities may include summing the number of touch inputs the first remote computing device is capable of receiving and the number of touch inputs the second remote computing device is capable of receiving. According to yet other aspects, the data corresponding to the first gesture may be formatted for interpretation through processing of raw multi-touch information at the first remote computing device.

In still other arrangements, devices, systems and apparatuses having hardware components and software providing the functionality and features described herein may be provided. For example, a device may include a network interface for establishing one or more connection with other devices and a processor configured to execute software. The software may, for example, cause the device or apparatus to provide one or more functions, features or other aspects described herein.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Applications may be executed remotely by a first computing device for use at a second computing device (e.g., a client device). By using a remoted application, the client device may use processing power by the first computing device to execute the functionality and features of the remoted application. Additionally, data and applications may be served at a location that is accessible from multiple remote locations (e.g., through a public and/or private network).

Figure 1A:
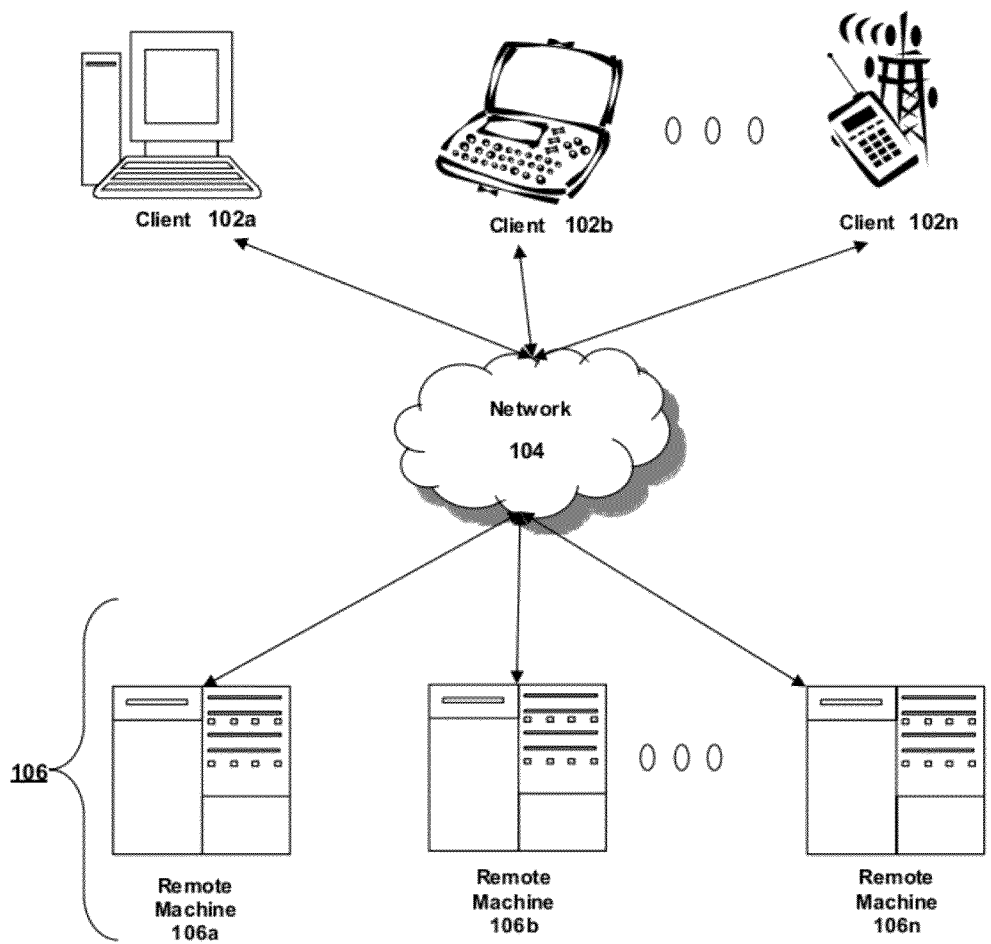
FIG. 1A illustrates an example network environment that may be configured to provide remote access to computing devices and application programs executing thereon according to one or more aspects described herein.

FIG. 1A illustrates an example computing environment 101 that includes one or more client machines 102A-102N (collectively referred to herein as "client machine(s) 102") that are in communication with one or more servers 106A-106N (generally referred to herein as "server(s) 106"). Installed in between the client machine(s) 102 and server(s) 106 is a network.

In one example, the computing environment 101 can include an appliance (e.g., a device or apparatus) installed between the server(s) 106 and client machine(s) 102. This appliance can manage client/server connections, and in some cases can load balance client connections amongst a plurality of backend servers.

The client machine(s) 102 may, in some examples, be a single client machine 102 or a single group of client machines 102, while server(s) 106 may be a single server 106 or a single group of servers 106. In one example, a single client machine 102 may communicate with more than one server 106, while in another example, a single server 106 may communicate with more than one client machine 102. In yet another example, a single client machine 102 might only communicate with a single server 106.

A client machine 102 may, in some examples, be referenced by any one of the following terms: client machine(s) 102; client(s); client computer(s); client device(s); client computing device(s); local machine; remote machine; client node(s); endpoint(s); endpoint node(s); or a second machine. The server 106, in some examples, may be referenced by any one of the following terms: server(s), local machine; remote machine; server farm(s), host computing device(s), or a first machine(s).

According to one or more arrangements, the client machine 102 may be a virtual machine 102C. The virtual machine 102C may be any virtual machine, while in some configurations, the virtual machine 102C may be any virtual machine managed by a hypervisor developed by XenSolutions, Citrix Systems, IBM, VMware, or any other hypervisor. In other examples, the virtual machine 102C can be managed by any hypervisor, while in still other examples, the virtual machine 102C can be managed by a hypervisor executing on a server 106 or a hypervisor executing on a client 102.

The client machine 102 may, in some examples, execute, operate or otherwise provide an application such as: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Accordingly, in at least some arrangements, remoting an application may include a client device 102 receiving and displaying application output generated by an application remotely executing on a server 106 or other remotely located machine or computing device. For example, the client device 102 may display program output in application program window, a browser, or other output window. In one example, the program is a desktop or virtual desktop, while in other examples the program is an application. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted). Applications may be remoted in multiple ways. In one example, applications may be remoted in a seamless manner in which windows are created on the client device so as to make the application display seem as if it were running locally on the client device and the desktop thereof. In another example, a remoted application may be provided in a windowed mode where a desktop is remoted to the client device and the application is displayed as an application executing in the remoted desktop. Various other remoting methods and techniques may also be implemented or used.

According to some aspects, the server 106 may execute a remote presentation client or other client or program that uses a thin-client or remote-display protocol to capture display output generated by an application executing on a server 106 and to subsequently transmit the application display output to a remote client 102. The thin-client or remote-display protocol can be any one of the following protocols (or other suitable protocol): the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically and/or physically grouped together into a server farm 106. In one example, the server farm 106 can include servers 106 that are geographically dispersed and logically grouped together in a server farm 106, or, in another example, servers 106 that are located proximate to each other and logically grouped together in a server farm 106. Geographically dispersed servers 106A-106N within a server farm 106 can, in some examples, communicate using a WAN, MAN, or LAN, where different geographic regions can be characterized as: different continents; different regions of a continent; different countries; different states; different cities; different zip codes; different neighborhoods; different campuses; different rooms; or any combination of the preceding geographical locations. In some examples, the server farm 106 may be administered as a single entity, while in other examples, the server farm 106 can include multiple server farms 106.

A server farm 106 may include servers 106 that execute a substantially similar type of operating system platform (e.g., WINDOWS NT, manufactured by Microsoft Corp. of Redmond, Wash., UNIX, LINUX, or SNOW LEOPARD.) In other examples, the server farm 106 can include a first group of servers 106 that execute a first type of operating system platform, and a second group of servers 106 that execute a second type of operating system platform. The server farm 106, in other examples, can include servers 106 that execute different types of operating system platforms.

The server 106, in some examples, may be of any server type. In other examples, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some examples, a server 106 may be a RADIUS server that includes a remote authentication dial-in user service. In arrangements where the server 106 includes an appliance, the server 106 may be an appliance manufactured by any one of the following manufacturers: the Citrix Application Networking Group; Silver Peak Systems, Inc; Riverbed Technology, Inc.; F5 Networks, Inc.; or Juniper Networks, Inc. Some examples include a first server 106A that receives requests from a client machine 102, forwards the request to a second server 106B, and responds to the request generated by the client machine 102 with a response from the second server 106B. The first server 106A may acquire an enumeration of applications available to the client machine 102 as well as address information associated with an application server 106 hosting an application identified within the enumeration of applications. The first server 106A may then present a response to the client's request using a web interface, and communicate directly with the client 102 to provide the client 102 with access to an identified application.

The server 106 may, in some examples, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another example includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other examples include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may, in some examples, be a client node that seeks access to resources provided by a server 106. In other examples, the server 106 may provide clients 102 or client nodes with access to hosted resources. The server 106, in some examples, functions as a master node such that it communicates with one or more clients 102 or servers 106. In some examples, the master node may identify and provide address information associated with a server 106 hosting a requested application, to one or more clients 102 or servers 106. In still other examples, the master node may be a server farm 106, a client 102, a cluster of client nodes 102, or an appliance.

One or more clients 102 and/or one or more servers 106 may transmit data over a network 104 installed between machines and appliances within the computing environment 101. The network 104 may comprise one or more sub-networks, and may be installed between any combination of the clients 102, servers 106, computing machines and appliances included within the computing environment 101. In some examples, the network 104 may be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further examples include a network 104 that may be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link may be an infrared channel or satellite band. The network topology of the network 104 may differ within different examples, possible network topologies include: a bus network topology; a star network topology; a ring network topology; a repeater-based network topology; or a tiered-star network topology. Additional examples may include a network 104 of mobile telephone networks that use a protocol to communicate among mobile devices, where the protocol may be any one of the following: AMPS; TDMA; CDMA; GSM; GPRS UMTS; or any other protocol able to transmit data among mobile devices.

Figure 1B:
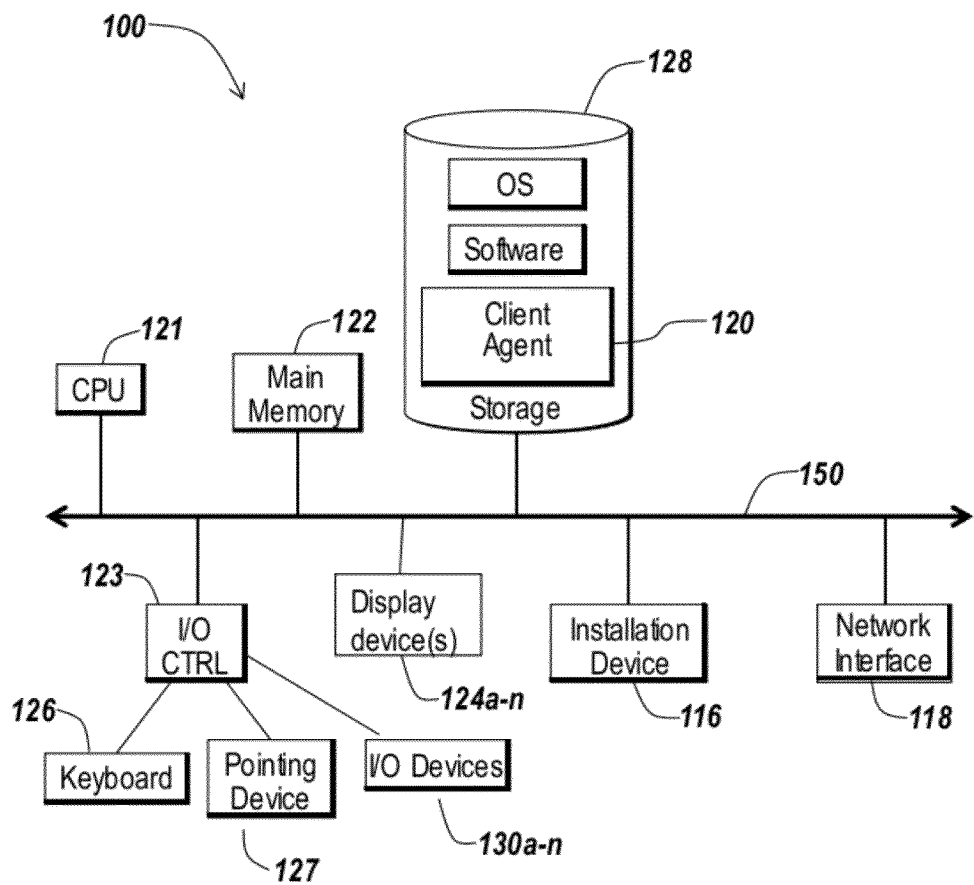
FIG. 1B and FIG. 1C are block diagrams illustrating example computing devices according to one or more aspects described herein.

FIG. 1B illustrates an example computing device 100. The client machine 102 and server 106 illustrated in FIG. 1A may be deployed as and/or executed on any example of computing device 100 illustrated and described herein or any other computing device. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one example, the storage memory 128 includes: an operating system, software routines, and a client agent 120. The I/O controller 123, in some examples, is further connected to a key board 126, and a pointing device 127. Other examples may include an I/O controller 123 connected to one or more of input/output devices 130A-130N.

Figure 1C:
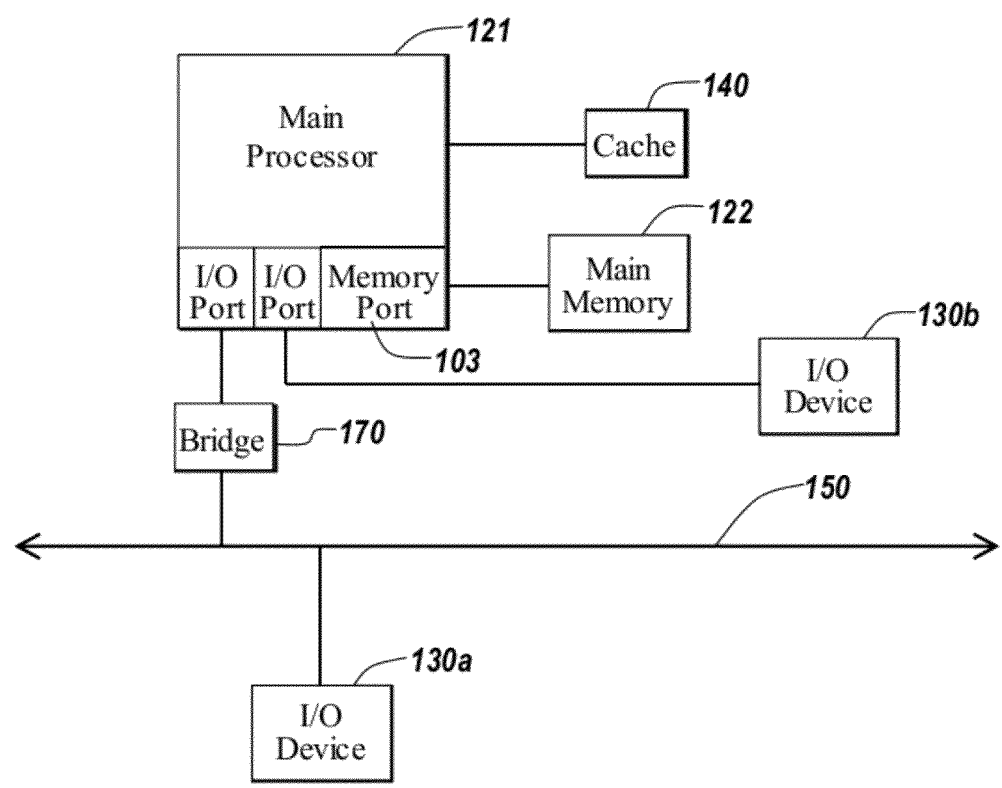

FIG. 1C illustrates an example computing device 100, where the client machine 102 and server 106 illustrated in FIG. 1A may be deployed as and/or executed on any example of the computing device 100 illustrated and described herein or any other computing device. Included within the computing device 100 is a system bus 150 that communicates with the following components: a bridge 170, and a first I/O device 130A. In another example, the bridge 170 is in further communication with the main central processing unit 121, where the central processing unit 121 may further communicate with a second I/O device 130B, a main memory 122, and a cache memory 140. Included within the central processing unit 121, are I/O ports, a memory port 103, and a main processor.

Examples of the computing machine 100 may include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other examples of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some examples the computing device 100 may include one or more processing units 121. In these examples, the computing device 100 may store and execute firmware or other executable instructions that, when executed, direct the one or more processing units 121 to simultaneously execute instructions or to simultaneously execute instructions on a single piece of data. In other examples, the computing device 100 may store and execute firmware or other executable instructions that, when executed, direct the one or more processing units to each execute a section of a group of instructions. For example, each processing unit 121 may be instructed to execute a portion of a program or a particular module within a program.

In some examples, the processing unit 121 may include one or more processing cores. For example, the processing unit 121 may have two cores, four cores, eight cores, etc. In one example, the processing unit 121 may comprise one or more parallel processing cores. The processing cores of the processing unit 121, may in some examples access available memory as a global address space, or in other examples, memory within the computing device 100 may be segmented and assigned to a particular core within the processing unit 121. In one example, the one or more processing cores or processors in the computing device 100 may each access local memory. In still another example, memory within the computing device 100 may be shared amongst one or more processors or processing cores, while other memory may be accessed by particular processors or subsets of processors. In examples where the computing device 100 includes more than one processing unit, the multiple processing units may be included in a single integrated circuit (IC). These multiple processors, in some examples, may be linked together by an internal high speed bus, which may be referred to as an element interconnect bus.

In examples where the computing device 100 includes one or more processing units 121, or a processing unit 121 including one or more processing cores, the processors may execute a single instruction simultaneously on multiple pieces of data (SIMD), or in other examples may execute multiple instructions simultaneously on multiple pieces of data (MIMD). In some examples, the computing device 100 may include any number of SIMD and MIMD processors.

The computing device 100, in some examples, may include a graphics processor or a graphics processing unit (Not Shown). The graphics processing unit may include any combination of software and hardware, and may further input graphics data and graphics instructions, render a graphic from the inputted data and instructions, and output the rendered graphic. In some examples, the graphics processing unit may be included within the processing unit 121. In other examples, the computing device 100 may include one or more processing units 121, where at least one processing unit 121 is dedicated to processing and rendering graphics.

In one example, computing machine 100 may include a central processing unit 121 that communicates with cache memory 140 via a secondary bus also known as a backside bus, while another example of the computing machine 100 includes a central processing unit 121 that communicates with cache memory via the system bus 150. The local system bus 150 may, in some examples, also be used by the central processing unit to communicate with more than one type of I/O device 130A-130N. In some examples, the local system bus 150 may be any one of the following types of buses: a VESA VL bus; an ISA bus; an EISA bus; a MicroChannel Architecture (MCA) bus; a PCI bus; a PCI-X bus; a PCI-Express bus; or a NuBus. Alternatively or additionally, computing machine 100 may include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further examples of the computing machine 100 include a processor 121 that communicates with one I/O device 130A using a local interconnect bus and a second I/O device 130B using a direct connection.

The computing device 100, in some examples, includes a main memory unit 122 and cache memory 140. The cache memory 140 may be any memory type, and in some examples may be any one of the following types of memory: SRAM; BSRAM; or EDRAM. Other examples include cache memory 140 and a main memory unit 122 that may be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further examples include a central processing unit 121 that may access the main memory 122 via: a system bus 150; a memory port 103; or any other connection, bus or port that allows the processor 121 to access memory 122.

In one or more arrangements, computing device 100 may provide support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications may, in some examples, include a client agent 120, or any portion of a client agent 120. The computing device 100 may further include a storage device 128 that may be either one or more hard disk drives, or one or more redundant arrays of independent disks; where the storage device is configured to store an operating system, software, programs applications, or at least a portion of the client agent 120. Computing device 100 may also include an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections may also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 may comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

According to one or more aspects, computing device 100 may include any one of the following I/O devices 130A-130N: a keyboard 126; a pointing device 127; mice; track pads; an optical pen; trackballs; microphones; drawing tablets; video displays; speakers; inkjet printers; laser printers; and dye-sublimation printers; or any other input/output device able to perform the methods and systems described herein. An I/O controller 123 may in some examples connect to multiple I/O devices 103A-130N to control the one or more I/O devices. In some examples, I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Additionally or alternatively, computing device 100 may include I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some examples, the computing machine 100 may connect to multiple display devices 124A-124N, in other examples the computing device 100 may connect to a single display device 124, while in still other examples the computing device 100 connects to display devices 124A-124N that are the same type or form of display, or to display devices that are different types or forms. Examples of the display devices 124A-124N may be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some examples be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other examples of the computing device 100 may include multiple display devices 124A-124N provided by multiple secondary computing devices and connected to the main computing device 100 via a network.

According to one or more arrangements, the computing machine 100 may execute any operating system including: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In some examples, the computing machine 100 may execute multiple operating systems. For example, the computing machine 100 may execute PARALLELS or another virtualization platform that may execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer (e.g., a tablet computer such as the iPad and iPad 2 manufactured by Apple Computer); a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other examples the computing machine 100 may be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other examples, the computing device 100 may be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some examples, the computing device 100 may have different processors, operating systems, and input devices consistent with the device. For example, in one example, the computing device 100 is a TREO 180, 270, 600, 650, 680, 700p, 700w, or 750 smart phone manufactured by Palm, Inc. In some of these examples, the TREO smart phone is operated under the control of the PalmOS operating system and includes a stylus input device as well as a five-way navigator device.

According to one or more configurations, the computing device 100 may be a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some examples, the computing device 100 is a mobile device manufactured by Nokia of Finland, or by Sony Ericsson Mobile Communications AB of Lund, Sweden.

In some examples, the computing device 100 may be a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other examples, the computing device 100 is a smart phone, Pocket PC, Pocket PC Phone, or other handheld mobile device supporting Microsoft Windows Mobile Software. Moreover, the computing device 100 may be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Additionally or alternatively, the computing device 100 may be a digital audio player. For example, the computing device 100 is a digital audio player such as the Apple IPOD, IPOD Touch, IPOD NANO, and IPOD SHUFFLE lines of devices, manufactured by Apple Computer of Cupertino, Calif. In another of these examples, the digital audio player may function as both a portable media player and as a mass storage device. In other examples, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other examples, the computing device 100 is a portable media player, such as the Zen Vision W, the Zen Vision series, the Zen Portable Media Center devices, or the Digital MP3 line of MP3 players, manufactured by Creative Technologies Ltd. In yet other examples, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

The computing device 100 may, alternatively or additionally, include a combination of devices, such as a mobile phone combined with a digital audio player or portable media player. In one of these examples, the computing device 100 is a Motorola RAZR or Motorola ROKR line of combination digital audio players and mobile phones. In another of these examples, the computing device 100 is an iPhone smartphone, manufactured by Apple Computer of Cupertino, Calif.

Application Display Management

Figure 2A:
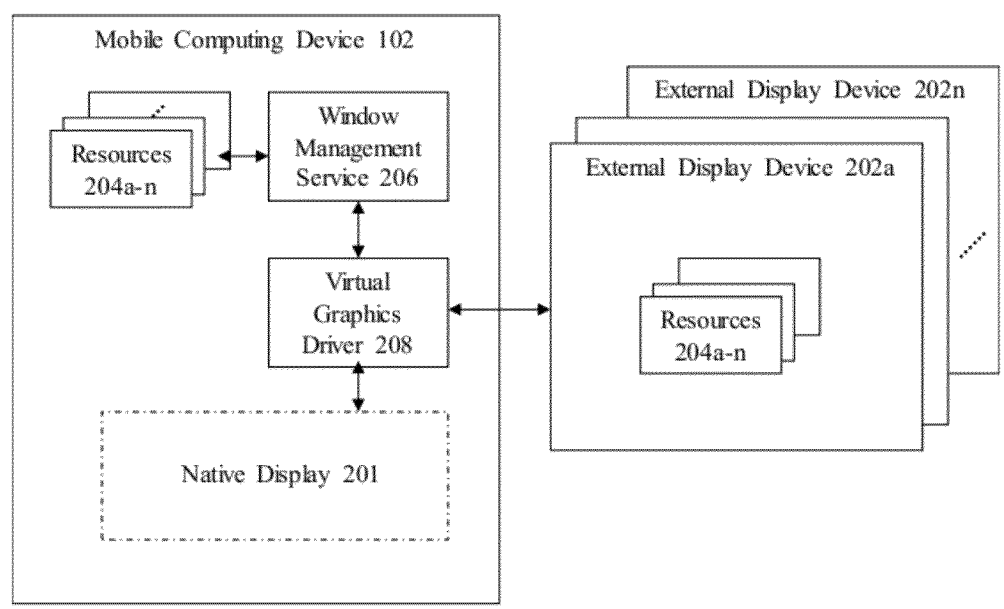
FIG. 2A is a block diagram illustrating an example system for displaying a plurality of resources in a user-configurable display layout on an external display device according to one or more aspects described herein.

Referring now to FIG. 2A, the block diagram illustrates an example system for displaying a plurality of resources on one or more display devices. The system includes a mobile computing device 102 that may communicate with one or more external display devices 202a-n. The example in FIG. 2A shows a mobile computing device 102 with a native display 201, although devices without native displays may also be used. The mobile computing device 102 executes a plurality of resources 204a-n (collectively, 204). The window management system 206 and virtual graphics driver 208 manage the locations and sizes of the display of output data associated with each of the plurality of resources in a user-configurable display layout. In many examples, the mobile computing device 102 transmits the output data associated with each of the plurality of resources 204 to an external display device 202. In some of these examples, the mobile computing device 102 transmits the output data upon establishing a connection with the external display device 202. Alternatively or additionally, the mobile computing device 102 transmits the output data associated with each of the plurality of resources 204 to the device's native display 201. For example, the mobile computing device 102 might only transmit the output data to the device's native display or only transmit the output data to one or more of the external display devices 202a-n. In some examples, the mobile computing device 102 transmits the output data associated with certain of the plurality of resources 204 to the native display 201 and transmits the output data associated with other ones of the plurality of resources 204 to the external display devices 202a-n.

Mobile computing device 102 may be configured to execute a plurality of resources 204. In one example, the mobile computing device 102 is a client 102 as described above in connection with FIGS. 1A-1C. In another example, the mobile computing device 102 displays the output data associated with a resource 204a in a plurality of resources 204a-n executed by the mobile computing device 102. In some examples, the mobile computing device 102 displays the output data associated with each of the plurality of resources 204.

A resource in the plurality of resources 204 may include, without limitation, a data file, an executable file, configuration files, an application, a desktop environment (which may itself include a plurality of applications for execution by the user), a computing environment image (such as a virtual machine image), and/or operating system software or other applications needed to execute a computing environment image.

According to one or more arrangements, mobile computing device 102 includes a window management service 206 allowing an external display device 202 to display the output data associated with each of a plurality of resources 204 executed on the mobile computing device 102. The window management service 206 may also allow multiple resources running on the mobile computing device 102 to be viewed on an external display device 202 or the native display 201 at substantially the same time, as opposed to allowing the output of one resource 204 to be viewed exclusively on the native display 201 or external display device 202. In one example, the window management service 206, in conjunction with a virtual graphics driver 208, manages the display layout of the windows displayed on the external display device 202 and the native display 201. In some examples, the virtual graphics driver 208 is a driver-level component that manages a virtual screen frame buffer storing output data that will be displayed by the native display 201 on the mobile computing device 102 or an external display device 202. The window management service 206, in conjunction with the virtual graphics driver 208, may further manage the boundaries and size of a screen space used to display output data and on which display device the output data is displayed.

In some examples, an external display device 202 receives output data associated with each of the plurality of resources 204 and displays the output data in a user-configurable display layout. In one example, the external display device 202 includes a dock to which the mobile computing device 102 connects. In another example, the external display device 202 includes a receiver for communicating with the mobile computing device 102 wirelessly, for example, via BLUETOOTH, Wi-Fi or other networking protocols, as described above in connection with FIGS. 1A-1C. In still another example, the external display device 202 may be a display device 124 as described above in connection with FIGS. 1B and 1C.

Figure 2B:
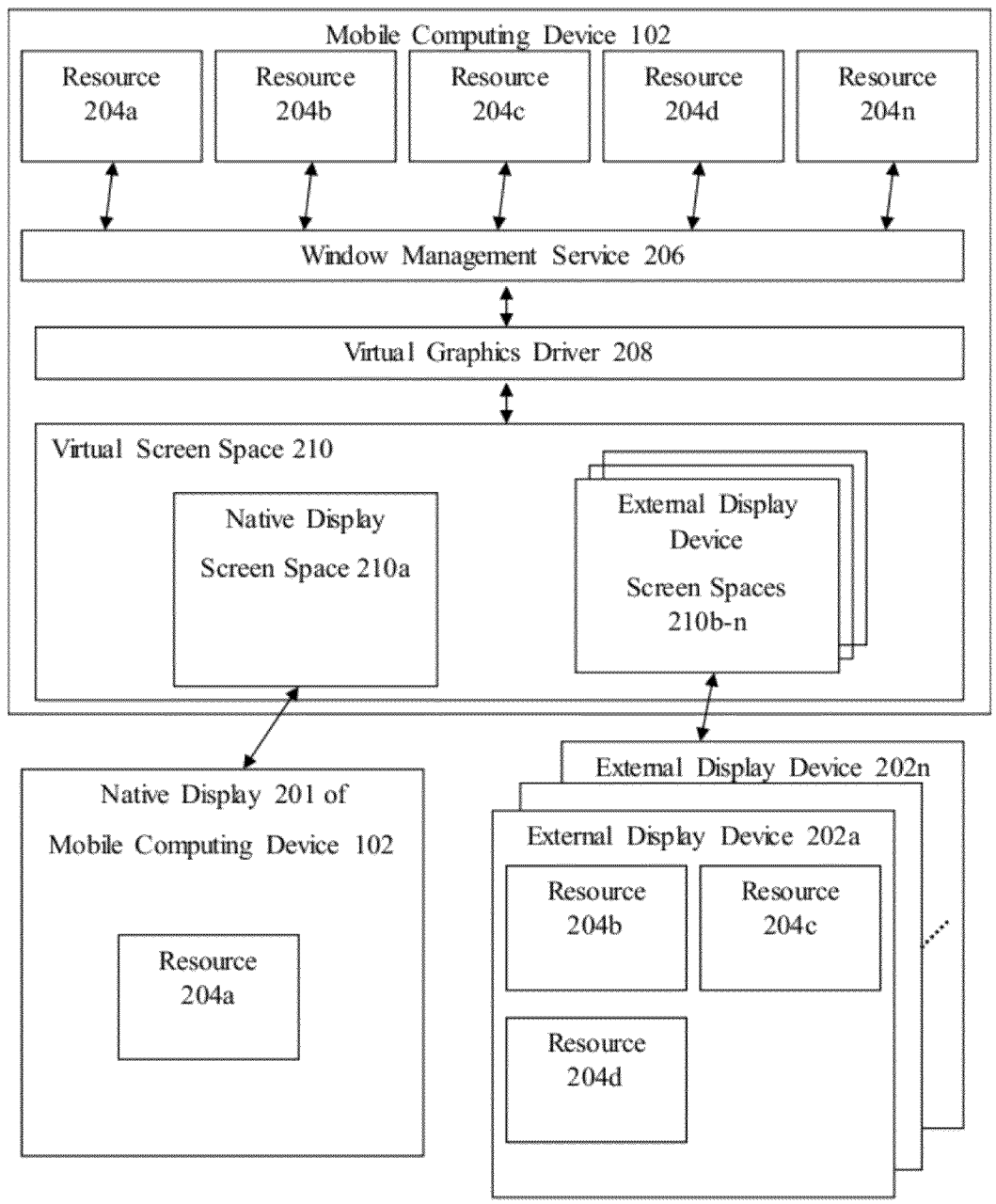
FIG. 2B is a block diagram illustrating an example system for mapping a display of one or more resources to one or more display devices according to one or more aspects described herein.

Referring now to FIG. 2B, the block diagram illustrates an example system for mapping the display of one or more resources 204 of the mobile computing device 102 on one or more display devices 201 and/or 202. In various examples, the window management service 206 manages a virtual screen space 210. The virtual screen space 210 may map to the native display 201 and one or more external display devices 202. The window management service 206 may position output data associated with the user interfaces of one or more resources 204 on the virtual screen space 210 to specify where each user interface will be displayed. In some examples, the window management service 206 positions the output data according to a user preference. In additional examples, the window management service 206 positions the output data according to a policy. In various examples, the window management service 206 positions the output data based on the resource 204 associated with the output data.

The window management service 206 communicates with the virtual graphics driver 208 to transmit output data associated with user interfaces of resources 204 to the native display 201 and one or more external display devices 202. In some examples, the window management service 206 may transmit output data and associated coordinates from the virtual screen space 210 to the virtual graphics driver 208. In various examples, the virtual graphics driver 208 stores the output data in a virtual screen frame buffer. In many examples, the virtual graphics driver 208 transmits the entries in the virtual screen frame buffer to the native display 201 and external display devices 202. In many examples, the virtual graphics driver 208 transmits an entry in the virtual screen frame buffer to a native display 201 or an external display device 202 based on the position of the entry in the frame buffer.

Figure 2C:
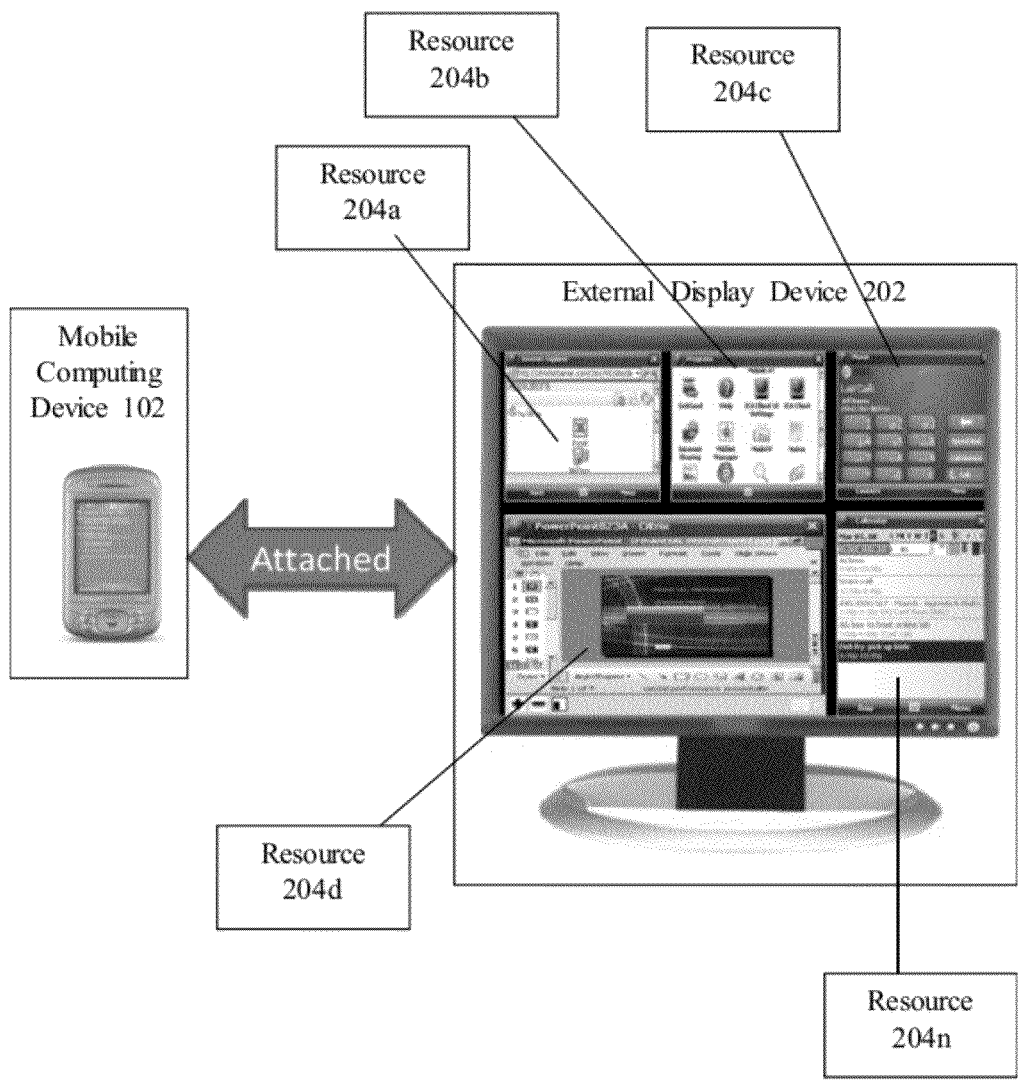
FIG. 2C illustrates an example interface displaying a plurality of resources in a user-configurable display layout on an external display device, the user-configurable display layout divided into a grid according to one or more aspects described herein.

Referring now to FIG. 2C, the user interface illustrates an example user-configurable display layout in which the external display device 202 displays the output data of the resources 204. In this example, the output data of the resources 204 is displayed in a grid display layout. The grid display layout may include one or more cells in an arrangement. A cell may display output data associated with a resource. In some examples, more than one cell displays output data associated with the same resource.

Additionally, in some examples, the cells are uniformly sized, whereas in other examples, the cells have different sizes. The cells may be arranged in any configuration. In some examples, the cells may be arranged in rows, columns, or both. A cell may have a descriptor associated with the cell's position in the grid. The descriptor may indicate the position of a cell within a row. In the example depicted in FIG. 2C, the cell for resource 204a may have the descriptor "1-1," the cell for resource 204b may have the descriptor "1-2," the cell for resource 204c may have the descriptor "1-3," the cell for resource 204d may have the descriptor "2-1," and the cell for resource 204d may have the descriptor "2-2." In other examples, the cells may be numbered, e.g. "Cell 1," "Cell 2," etc. However, any system of choosing descriptors known to those of ordinary skill in the art may be used.

In various examples, the window management service 206 configures a grid display layout according to the resources 204 being displayed on the native display 201 or the external display device 202. In some examples, the service 206 configures a grid display layout according to the number of resources 204 being displayed. In other examples, the service 206 configures a grid display layout according to the size or amount of content in the user interfaces of the resources 204. For example, if an external display device 202 will display four resources with comparable amounts of content, the window management service 206 may configure a grid display layout with four uniform cells. In another example, if an external display device 202 will display four resources and one resource includes three times as much content as the others, the window management service 206 may configure a grid display layout with three uniform cells in a first row and a single cell in a second row. The single cell in the second row may be three times as wide as the cells in the first row. In various examples, the window management service 206 may configure a grid display layout to reserve a cell for displaying information about the resources being displayed, such as a menu of the resources. In many examples, the window management service 206 may configure a grid display layout to reserve a cell for allowing a user to configure the grid display layout.

Figure 2D:
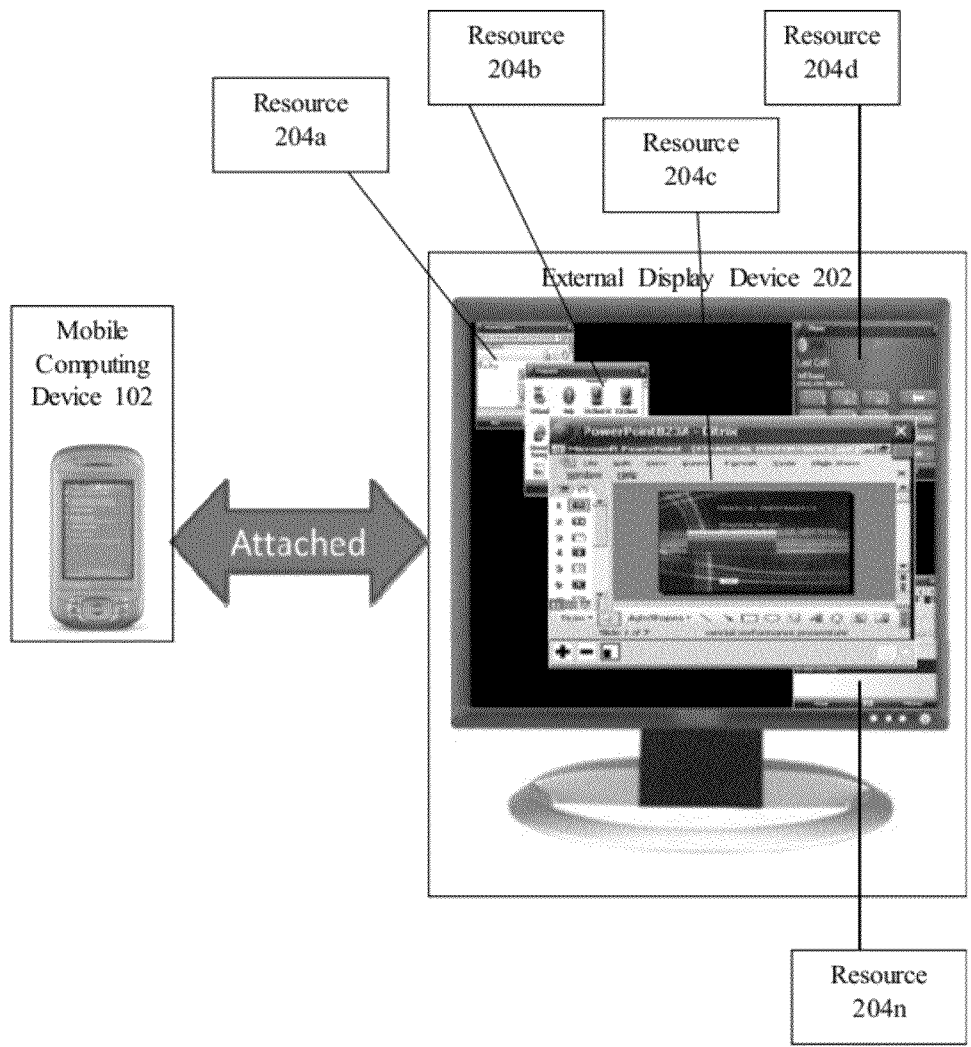
FIG. 2D illustrates an example interface displaying a plurality of resources in a user-configurable, dynamic display layout on an external display device according to one or more aspects described herein.

Referring now to FIG. 2D, a user interface illustrates an example user-configurable display layout providing a dynamic display layout in which the external display device 202 displays the output data associated with the plurality of resources 204. In this example, windows on the external display device 202 that display output data for resources 204 may be dynamically positioned and sized. The window management service 206 may position a user interface for a resource at a default position and with a default size chosen according to a policy, the resource 204, or any other method. The window management service 206 may order overlapping user interfaces such that higher-order user interfaces obscure lower-order user interfaces. The window management service 206 may transmit output data to the virtual graphics driver 208 reflecting the obfuscation. The user may re-position or re-size a window by, for example, clicking and dragging the window or a window edge. In these examples, the virtual graphics driver 208 may detect the user's change to the window, and transmit information about the user's change to the window management service 206. The window management service 206 may process the change and transmit updated output data to the virtual graphics driver 208. In some examples, the user moves the user interface for a resource 204 to any location on a native display 201 or external display device 202. In some examples, the user moves the user interface for a resource 204 to a different display device. In some examples, the updated output data indicates that one user interface's size has been increased or location has been adjusted to obscure another user interface. In other examples, the updated output data indicates that one user interface's size has been decreased or location has been adjusted such that more of another user interface shall be visible.

Figure 3A:
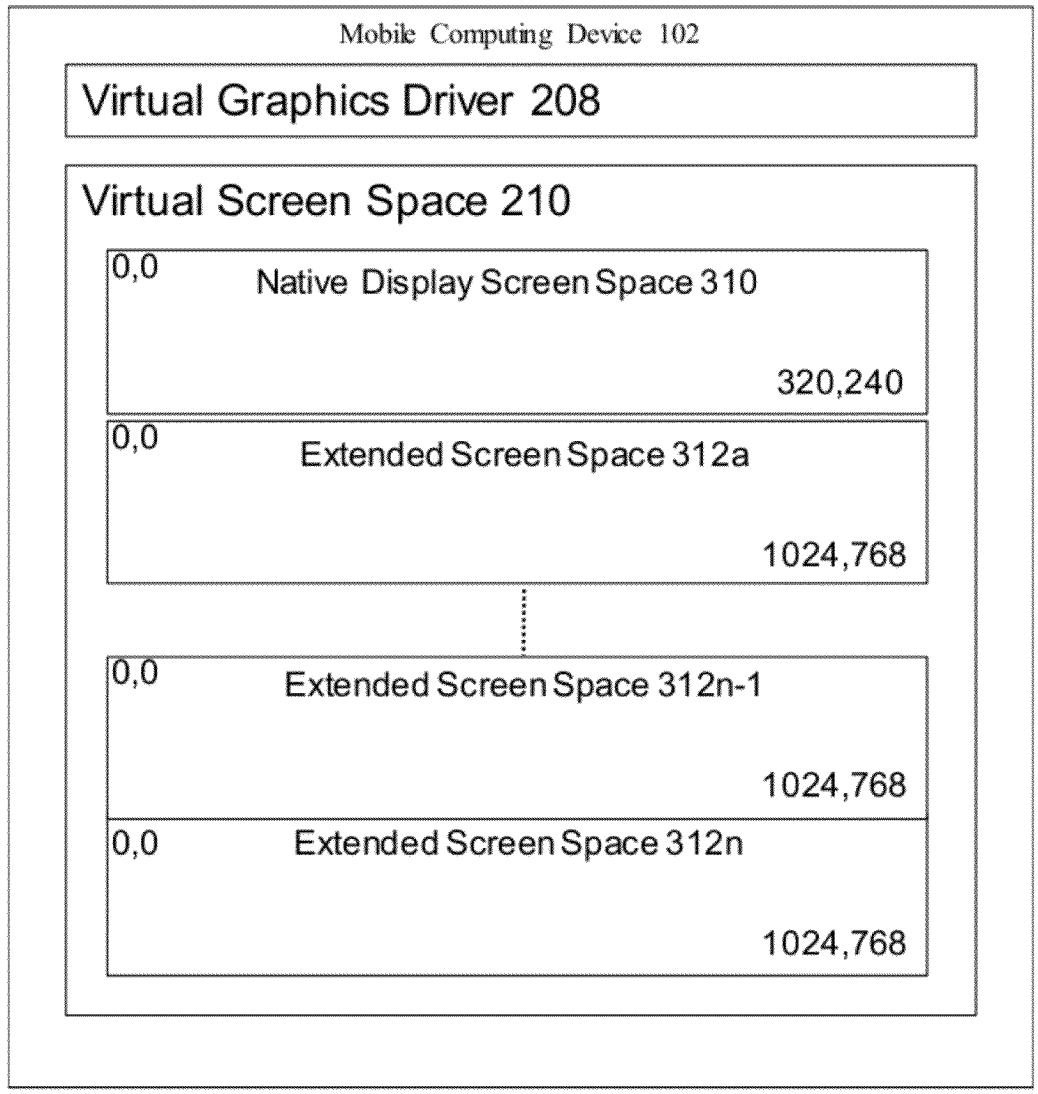
FIG. 3A is a block diagram illustrating example screen spaces provided by a mobile computing device attached to one or more external display devices according to one or more aspects described herein.

Referring now to FIG. 3A, a block diagram illustrates example virtual screen spaces 210 provided by a mobile computing device attached to one or more external display devices. As shown in FIG. 3A, the mobile computing device 102 includes a virtual graphics driver 208 and a virtual screen 210. The virtual screen 210 includes a plurality of virtual screen spaces 310 and 312*a-n*. Virtual screen space 310 may be a native display screen space for the native display 201 on the mobile computing device 102. The other virtual screen spaces 312*a-n* may be extended screen spaces that correspond to the displays of external display devices 202. The window management service 206 and virtual graphics driver 208 manage the virtual screen 210. In one example, the virtual graphics driver 208 uses a virtual screen frame buffer to manage the mobile computing device's native display 201 and change the native display's 201 screen resolution. In another example, the virtual graphics driver 208 uses a virtual screen frame buffer to manage an extended screen space 312 and to change a resolution of the extended screen 312.

In some examples, the virtual graphics driver 208 allocates and manages a plurality of virtual screen spaces 310, 312*a-n* and virtual screen frame buffers. In some of these examples, each virtual screen space and virtual screen frame buffer has a resolution independent of the other screen spaces and frame buffers. In one of these examples, output data associated with each of the plurality of resources 204 may reside within any of the virtual screen spaces 310, 312*a-n*. In another of these examples, each of the extended screen spaces 312*a-n* is associated with at least one external display device 202, depending on the capabilities of the device.

In various examples, the window management service 206 and the virtual graphics driver 208 allocate and manage the display, on a plurality of external display devices 202, of output data associated with a plurality of resources. For example, output data associated with a resource 204*a* displays on a mobile computing device 102, output data associated with a resource 204*b* displays on one external display device 202*a*, and output data associated with a resource 204*c* display on another external display device 202*b*. In another of these examples, the window management device 206 identifies one of the external display devices 202 for displaying output data generated by a resource 204*a* based upon a type of the resource 204*a*. For example, the window management service 206 may determine that a type of resource rendering a video may display on a television screen, while a type of resource rendering a word processing application may render on a display of a laptop computer.

Figure 3B:
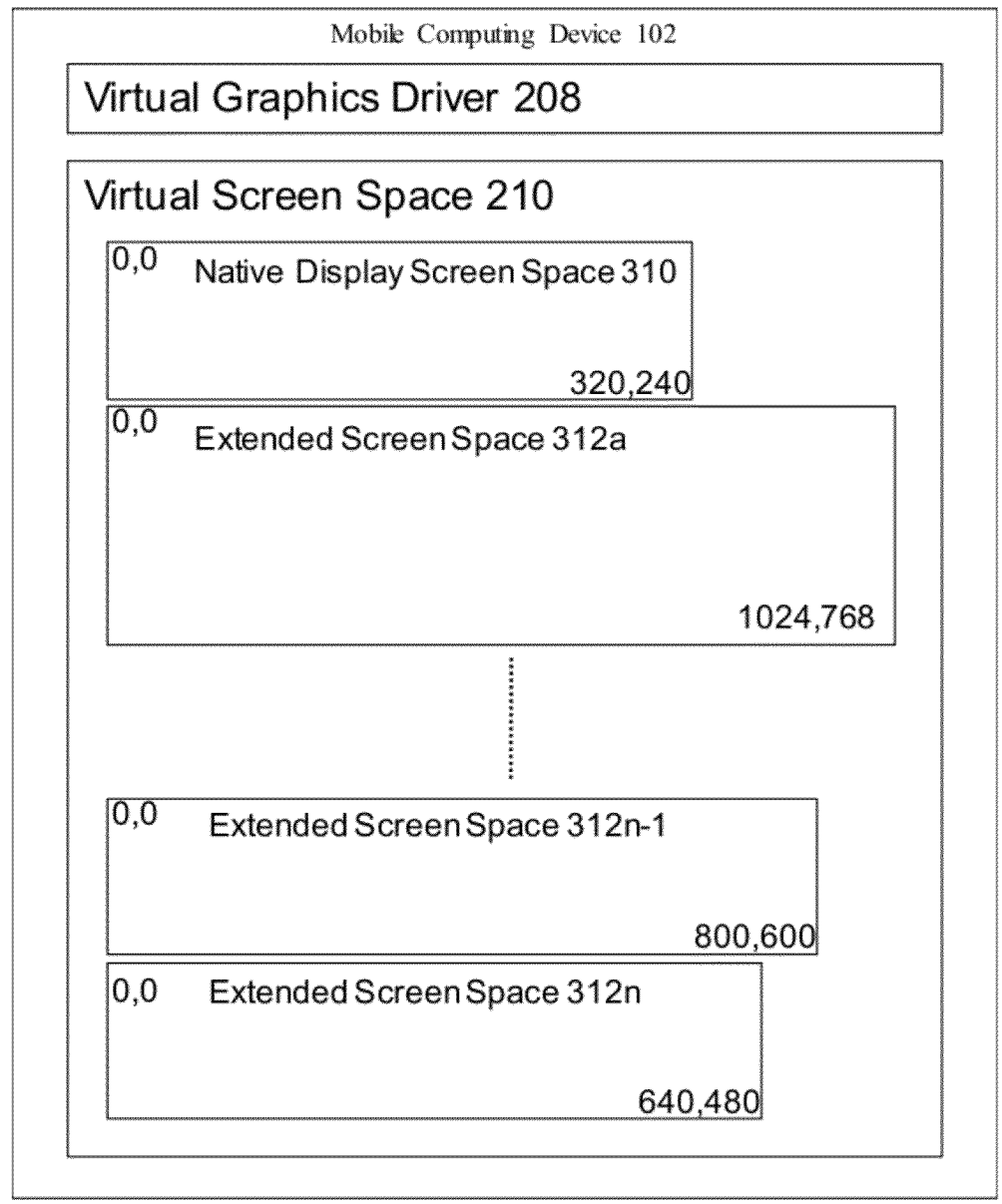
FIG. 3B is a block diagram illustrating an example mobile computing device providing a plurality of screen spaces according to one or more aspects described herein.

Referring now to FIG. 3B, a block diagram illustrates an example mobile computing device 102 providing a virtual screen 210 with virtual screen spaces 310, 312*a-n* of varying resolutions. In this example, the virtual screen 210 includes a native display screen space 310 corresponding to the native display 201 of the mobile computing device 102 with a resolution of 320 pixels×240 pixels. The virtual screen 210 also includes an extended screen 312*a* corresponding to the display of an external display device 202 with a resolution of 1024 pixels×768 pixels, an extended screen 312*n*−1 corresponding to the display of an external display device 202 with a resolution of 800 pixels×600 pixels, and an extended screen 312*n* corresponding to the display of an external display device 202 with a resolution of 640 pixels×480 pixels. In many examples, the virtual screen 210 may include a native display screen space 310 and any number of extended screens 312 of any resolution. The entire virtual screen space 210 may be mapped into a single virtual screen frame buffer, although examples that map into multiple buffers may be used.

Figure 3C:
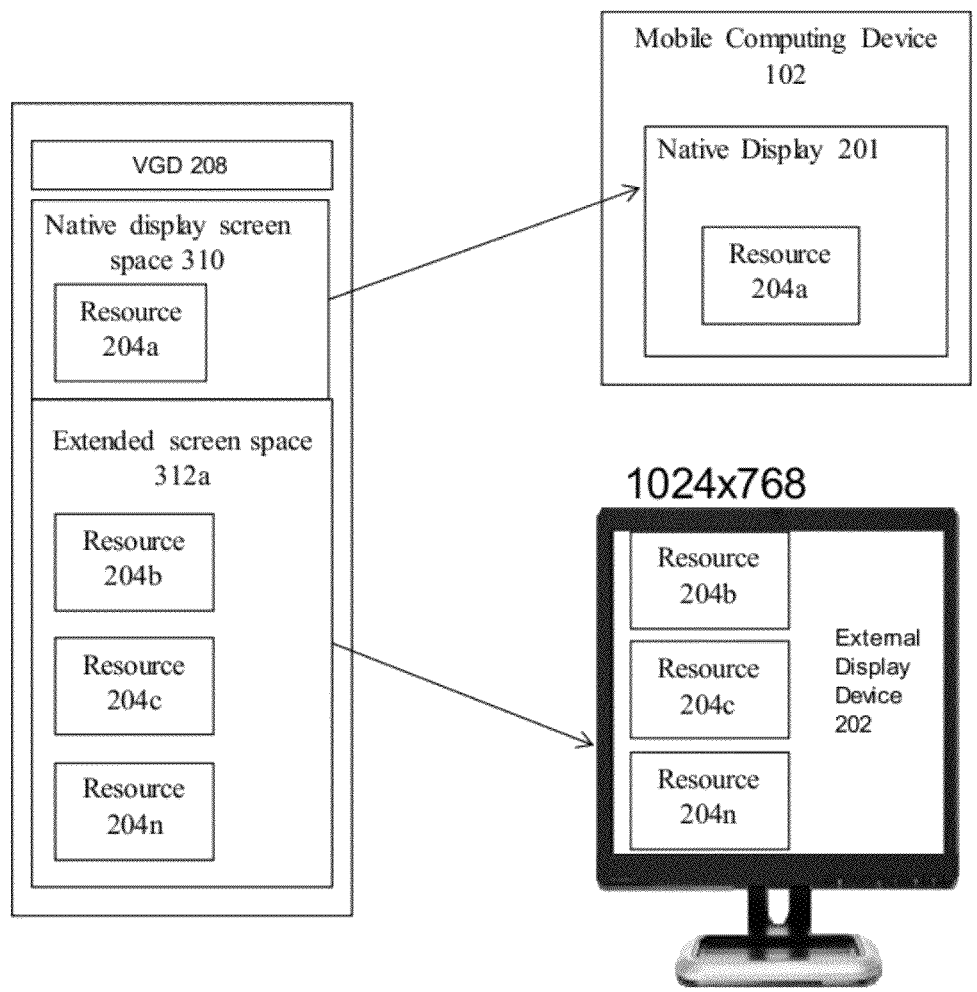
FIG. 3C is a block diagram illustrating an example logical representation of a plurality of screen spaces managed by a virtual graphics driver according to one or more aspects described herein.
Figure 4:
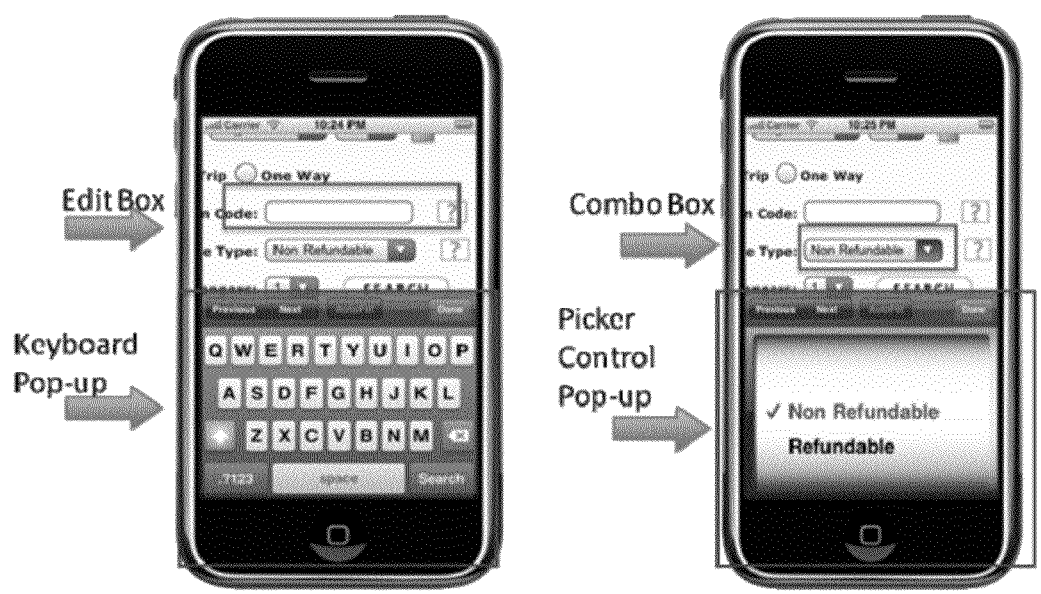
FIG. 4 illustrates an example known interface displaying a remoted application on a device.

Referring now to FIG. 3C, the block diagram illustrates an example logical representation of a plurality of virtual screen spaces managed by a virtual graphics driver. In this example, the virtual graphics driver 208 manages multiple virtual screen spaces with different resolutions in a virtual screen frame buffer. In this example, the native display 201 of the mobile computing device is the primary display and the external display device 202, corresponding to the extended screen 312*a*, is a secondary display. In various examples, output data associated with resources 204 on the native display screen space 310 will be displayed on the native display 201 and output data associated with resources 204 on the extended screen space 312*a* will be displayed on the external display device 202 associated with the extended screen spaces 312*a*. In other examples, all output data associated with resources 204 may be displayed on the native display 201. In still other arrangements, all output data associated with resources 204 may be displayed on an external display device such as external display device 202.

Supporting Touch Input in Remoting Applications

Figure 5:
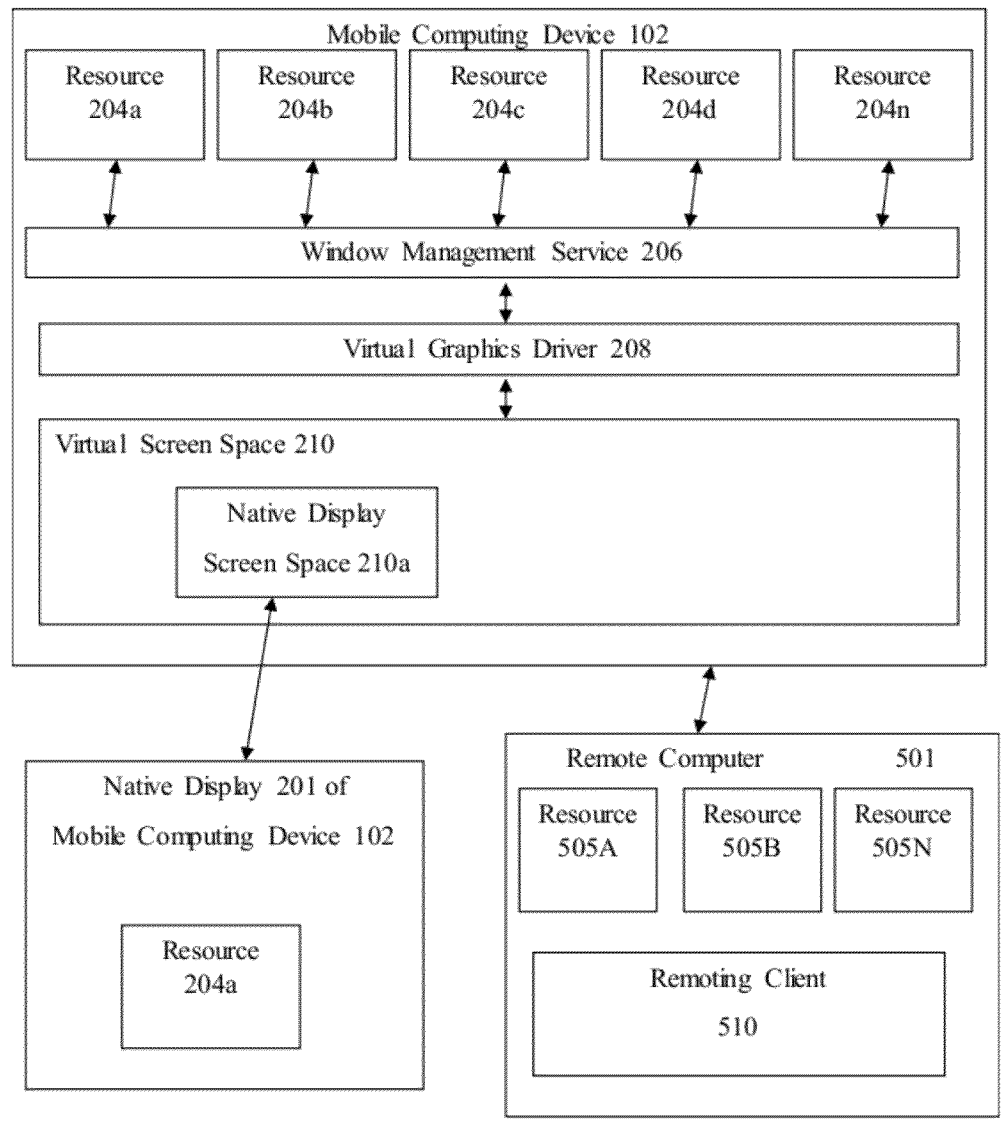
FIG. 5 is a block diagram illustrating an example system for altering the display of a remoted application on a device according to one or more aspects described herein.

FIG. 5 illustrates an example system in which applications may be remotely executed at a server while providing display and user interaction through a client device such as mobile device 102. Accordingly, a user may view and interact with an application remoted from (e.g., remotely executed by the server (e.g., remote computer 501)) at a client device (e.g., mobile device 102) without requiring the application and/or data to be installed or stored on the client device. The system of FIG. 5 may include a mobile computing device 102 (e.g., similar to that shown in FIG. 2B) configured to execute and/or store one or more resources 204 such as applications executing on the mobile computing device 102. In some examples, at least one resource may be an operating system executing on the mobile device 102 and one or more other resources may execute within the context of the operating system. The mobile device 102 may further execute a windows management service 206 that may communicate with other applications executing on the mobile device 102 and, in some examples, may communicate with a virtual graphics driver 208 and the resources or applications 204 executing on the mobile device 102. The mobile computing device 102 may further execute a virtual graphics driver 208, and may store a buffer for generating a virtual screen space 210 that may include a buffer for a native display screen space 210a. The mobile device 102 may communicate with a native display 201 of the mobile device 102 on which application output generated by a resource 204 may be displayed. The mobile device 102 may further communicate with a remote computer 501 that may execute one or more resources 505A-505N (generally referred to as remote resources 505) which may in some examples be remote applications 505. The remote computer 501 may further execute a remoting client 510. The remote applications 505 may be executed by the remote computer for use at the mobile device 102 in one or more arrangements as discussed in further detail below. When one or more remote applications 505 are executed by the remote computer for use at the mobile device 102, those applications may be considered remoted applications.

According to one or more arrangements, resources 204 executing on the mobile device 102 and/or resources 505A-505N may be applications configured to accept data inputted by a touch screen. For example, the applications may be modified versions of applications that typically do not receive data from a touch screen. These modified applications 204 may receive data inputted by a user via a touch screen of the mobile device 102, and may be modified to accommodate typical touch screen input functions like a virtual keyboard and a virtual scroll menu. For example, a modified version of SAFARI, a web browser published by APPLE, may be modified to pan up when a user selects or gives focus to an edit control such as a text box. SAFARI pans the application upwards to accommodate the virtual keyboard displayed over the browser and so that a user may view the text box while typing on the virtual keyboard.

Touch input may include a variety of instrument, hand or finger movements and actions including touching a point on the screen, stylus pen inputs, swiping movements, flicking movements, multi-finger or multi-touch actions (e.g., pinching, expansion) and gestures and the like. The touch input may trigger different functionalities depending on the type of application receiving the input. For example, some applications may receive a flicking action as closing the application while other applications may interpret a flicking input as moving the application window in a certain direction. Each application may define its own interpretation of different types of touch input or may use a standard definition provided by an underlying operating system.

According to one or more configurations, the mobile device 102 may communicate with remote computer 501 in a variety of ways. The remote computer 501 may be a server, a client or any other computing machine. In some examples the remote computer 501 may be a remote application server that executes one or more applications for mobile device 102. Accordingly, in some examples, the mobile device 102 may communicate with the remote computer 501 over one or more virtual channels. In some examples, virtual channels may be established over a network and may be referred to as a control virtual channel. In other examples, the virtual channel may be a seamless virtual channel. A control virtual channel may be used to remote control commands and other miscellaneous commands (e.g., for an application) while the seamless virtual channel may be used to remote application windows, a taskbar, a systray, etc. Thus, in some examples, each virtual channel may remote different functions and content. In still other examples, the virtual channel may be established by a window management service 206 executing on the mobile device 102, or the virtual channel may be established by both the window management service 206 and a remoting client 510 executing on the remote computer 501. The virtual channel may in some examples facilitate communication sent using the ICA protocol.

In some examples, the remote computer 501 may execute a remoting client 510. The remoting client 510 may be a control virtual channel or a seamless virtual channel and may be a remoting application that corresponds to the virtual channel used by the client 510 to transmit data to and receive data from the mobile device 102. In some examples, the remoting client 510 may collaborate with the window management service 206 (of the mobile computing device 102) to modify remote applications 505 for remote display on the mobile device 102. The window management service 206 may be, for example, a CITRIX RECEIVER published by CITRIX SYSTEMS. In some examples, the remoting client 510 may communicate with the remote applications 505 to intercept event providing notifications and data generated by the remote applications 505. In particular, the remoting client 510 may perform event-based detection of one or more controls using application programming interfaces provided by one or more of the remote applications 505. For example, at least one remote application 505 may be an operating system executing on the remote computer 501. Another remote application 505B may be executing on the remote computer 501 and within the context of the operating system 505. In these examples, the remoting client 510 may intercept events generated by controls within the remote application 505B using application program interfaces made available by the operating system 505. The controls may be selected by the remoting client 510 based on whether the control has focus on or is on a predetermined list of controls of interest. A control, in some examples, may be an object within an application that a user interacts with, e.g. a text box, drop down menu, radio button, button, check box, edit box, combo box etc. The control may further be referred to as a field or interactive element. In some examples, the remoting client 510 may intercept the control-generated events by registering with a communication interface associated with the application 505B to receive notifications when a focus-change event occurs within the application 505B. For example, the remoting client 510 may receive a notification when an object or control receives focus, e.g., indicating that a user selected a text box within the application.

In some examples, the remoting client 510 may communicate with the window management service 206 over the virtual channel. In a particular example, the remoting client 510 may send intercepted event notifications over the virtual channel to the window management service 206. In other examples, the remoting client 510 may transmit location coordinates for a control, the type of control, the contents of a control, the window handle of a control, and/or parent window information for a control. Window handles or other identification information for elements within an interface or application may include a globally unique identifier (GUID). The window management service 206 may receive information from the remoting client 510 and adjust or modify display of an application 204 on the native display 201 using the received information. Adjusting the display may include panning, zooming (in or out), scrolling or otherwise modifying the display of the application 204.

In some examples, the remote computer 501 may execute one or more resources 505. These resources, in some examples, may be applications. In other examples, at least one resource may be an operating system executing on the remote computer 501. In those examples, the other applications 505 may execute within the context of the operating system. In some instances, the applications 505 may correspond to remote applications 505 from the perspective of device 102 and one or more of applications 505 may be remoted to mobile device 102 for use by the user at mobile device 102.

Figure 6:
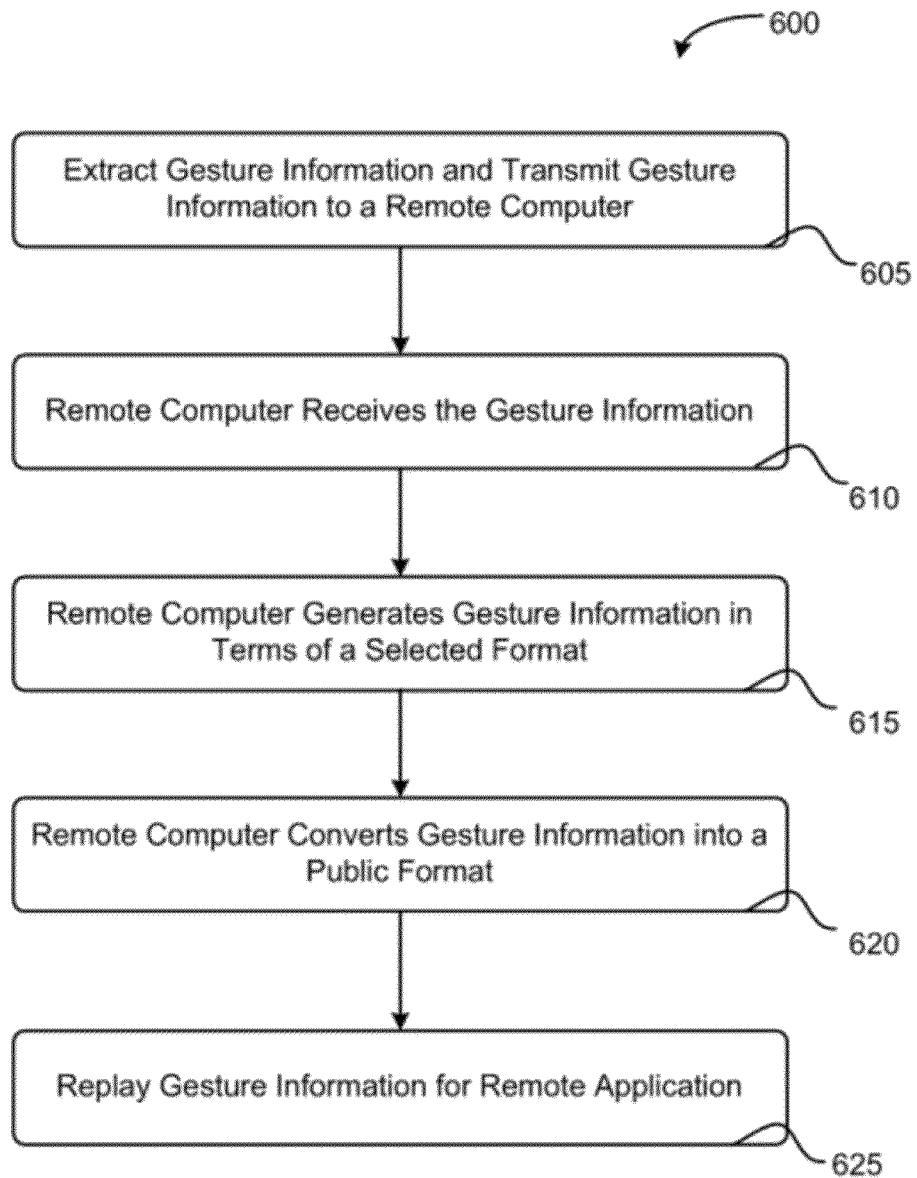
FIG. 6 is a flow diagram illustrating an example method for processing touch input for a remoted application on a device according to one or more aspects described herein.

FIG. 6 illustrates an example process 600 for remotely providing gesture information to a remote application. A window management service 206 executing on the mobile device 102 can extract gesture information and transmit the extracted information to a remote computer 501 (Step 605). The remote computer 501 can receive the gesture information (Step 610) and then generate new gesture information in terms of a selected format (Step 615). The remote computer 501 can then convert the gesture information into a public format (Step 620) and can replay the gesture information for a remote application (Step 625).

Figure 7:
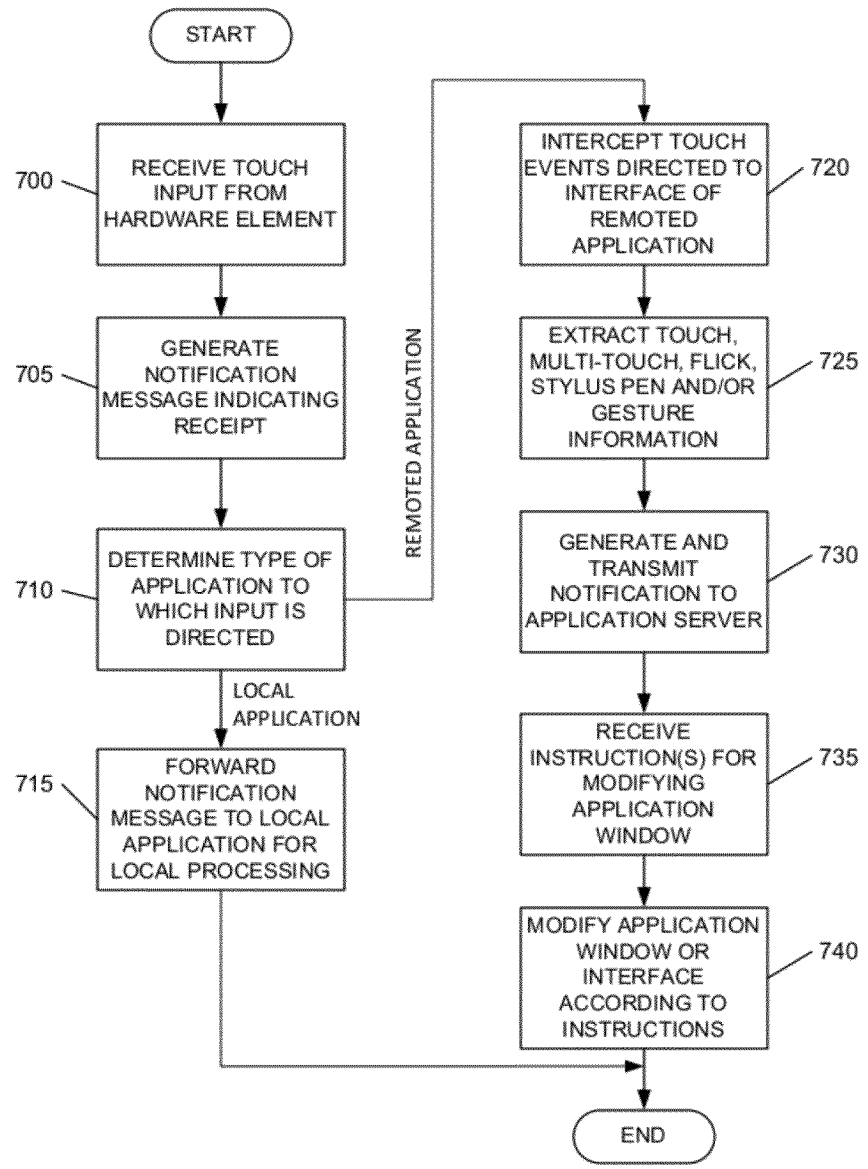
FIG. 7 is a flow diagram illustrating an example method for remoting touch input according to one or more aspects described herein.

FIG. 7 illustrates an example method by which a client device may detect touch input and process the touch input against a remoted application executing on a server. In step 700, for example, a window management service or other service or application of the client device may detect and/or receive touch input through a touch sensitive hardware element. In step 705, the client device may generate a notification message indicating detection and/or receipt of the touch input. In one example, the notification message may correspond to a WM_GESTURE or WM_TOUCH message specifying a kernel handle (e.g., a location pointer) to an undocumented, private address space where the touch input data is stored. In some examples, each time gesture or touch input is issued to an application window an operating system executing on the client device forwards the events to a corresponding application. However, in one or more arrangements, the client device may handle touch input events differently depending on the application to which the touch input event is directed. For example, the application may be a locally executing application, a remotely executing desktop or a remotely executing application (e.g. a seamless window of a remoted application). Accordingly, in step 710, the client device may determine a type of application corresponding to an application window or other user interface element to which the touch input is directed.

If the client device determines that the type of application is a locally executed application, the client device may forward the notification message to the application in step 715 for local processing by the application and/or the underlying operating system. If, however, the client device determines that the touch input is issued to an application window or user interface element corresponding to a remoted application or desktop, the operating system can ignore that input. Ignoring the input may cause the invocation of a default window procedure (e.g. DefWindowProc) which handles the input by trying to convert the gesture and multi-touch input into mouse events. In one or more examples, the client device (or a window management service thereof) may be configured to include a sub-function or module that may handle touch (e.g., multi-touch), flick, stylus pen and gesture events for remoted applications. In such a configuration, the window management service of the client device may intercept touch (e.g., gesture and multi-touch) events issued to an application window or other interface element corresponding to a remotely executing application or desktop and/or ignored by the local operating system in step 720.

The window management service of the client device, in response to intercepting or detecting a touch, multi-touch or gesture input message corresponding to a remoted application, may extract information about the gesture or touch input in step 725. Extracting the gesture information may include extracting the information from a HGESTUREINFO IPara parameter of WM_GESTURE using or hooking into the GetGestureInfo( ) function of the operating system API. The information extracted can include: the gesture state; a gesture identifier (e.g. GID_BEGIN, GID_END, GID_ZOOM, GID_PAN, GID_ROTATE); a target window handle (e.g. a handle of a corresponding window on the server); coordinates of the window and the area of the touch input; a sequence identifier; any additional arguments. Applications typically use a public GetGestureInfo( ) rather than the memory associated with the HGESTUREINFO IPara parameter because this parameter points to an undocumented memory structure. The window management service of the client device may further call a CloseGestureInfoHandle( ) API to free up resources. Using the extracted touch input information, the client device may generate and transmit a notification message to the server in step 730. In some examples, the notification message may include the notification message or a portion thereof intercepted by the window management service. The notification message may, for instance, retain some or all of the original formatting (e.g., format as intercepted).

According to some arrangements, steps 720 725 may be implemented differently based on the operating system of the client device. In a particular example, on the Windows 8 client operating system, the window management service 206 of the client device may execute in the Windows Runtime (WinRT) Platform, e.g., as a Metro Style application, and can retrieve the touch input using the PointerPoint interface. For example, the window management service 206 can retrieve common data such as contact ID, pixel location, and can also retrieve input-specific data from a property bag. The window management service 206 may also use the GestureRecognizer interface to register to receive events about gestures and configure the gestures themselves. The window management service 206 can retrieve raw touch input or gestures or both, separately or at the same time. Further, the window management service 206 can use the PointerDevice interface to retrieve various capabilities and properties, e.g., the type of input device, weather it is integrated or external, maximum input count, or get the supported HID usages of the device.

Similarly, on the Windows 8 client operating system, the window management service 206 of the client device may execute in the Win32 platform as a Desktop application, and can handle the WM_POINTER message (the equivalent of the WinRT PointerPoint) and retrieve the raw input data using the GetPointerInfo( ) API and related functions. The window management service 206 may also use the InteractionContext interface to retrieve componentized gesture recognition. The window management service 206 may retrieve raw touch input or gestures or both, separately or at the same time. The window management service 206 may also use the Win32 Pointer Device APIs to query the pointer devices in the client environment.

In another particular example, on the iOS operating system the window management service 206 of the client device may be implemented as an iOS application. The multi-touch interface of iOS devices generates low-level events when a user touches views of the iOS application. The window management service application may send these events (as UIEvent objects) to the view on which the touches occurred. A UIEvent object of type UIEventTypeTouches may represent a touch event. That view of the window management service application may analyze the touches represented by each event object and prepare them for transmission to the server as raw touch input. The view may interpret the touches as a common gesture, such as a tap or swipe gesture. The client application may make use of UIKit classes called gesture recognizers, each of which is designed to recognize a specific gesture, e.g., UITapGestureRecognizer for tapping, UIPinchGestureRecognizer for pinching in and out (zooming), (UIPanGestureRecognizer) for panning or dragging, UISwipeGestureRecognizer for swiping, UIRotationGestureRecognizer for rotation, UILongPressGestureRecognizer for press-and-hold, etc. Moreover, if the window management service application needs a UIKit object to respond to events differently, it may create and use a subclass of that framework class and override the appropriate event-handling methods. The window management service may also implement a completely custom gesture recognizer by subclassing UIGestureRecognizer, analyzing the stream of events in a multi-touch sequence to recognizing a distinct gesture. The window management service 206 can retrieve raw touch input or gestures or both, separately or at the same time.

After transmitting the touch event notification message to the server, the client device may receive, in step 735, one or more instructions indicating a manner in which to modify the application window or other user interface element to which the touch input is directed. The one or more instructions may be received from the server and indicate a display modification command such as zoom, scroll, pan, move, expand, shrink, minimize, maximize and the like. In step 740, the client device (or window management service) may modify the application interface element in accordance with the specified instructions. In one example, the one or more instructions may include an image of the updated application display or portion thereof and/or commands for modifying the application display window.

In one particular example, a client device may remote touch events, e.g. WM_TOUCH messages, that are issued to windows registered to accept raw touch input. When the client device sends the touch input, the window management service of the client device extracts the raw touch info from the (HTOUCHINPUT) lParam parameter of WM_TOUCH into an array of TOUCHINPUT structures using the GetTouchInputInfo( ) API. The number of touch points may be indicated by the wParam parameter of WM_TOUCH. In some embodiments, the client device may also send: an identifier for the touch contact sequence from the point a contact comes down until it comes back up, this identifier allows for multiple simultaneous sequences or multi-touch (multiple fingers or people); X and Y coordinates to the hundredth of a pixel of physical screen coordinates, this provides high precision for applications that require fine resolution (e.g. handwriting recognition); width and height of contact area; timestamp; whether this is a primary touch point, e.g. first touch point established; various aspects of the touch/point sequence such as down, move, up or hover events, whether input was coalesced, whether it was from the user's palm, etc.; and a device handle that can be used to retrieve information about the input device. In some arrangements, the device handle can be used to retrieve information about the client device. The window management service of the client device may further call a CloseTouchInputHandle( ) API to free up resources. After the server receives the touch input, the server may replay the touch input to a corresponding application window on the server (e.g. using SendMessage( ), SendMessageTimeout( ), SendNotifyMessage( ) or PostMessage( ) APIs to send WM_TOUCH), as described in further detail with respect to FIG. 8.

Additionally or alternatively, if a window management service intercepts or receives a GESTURENOTIFY message from an operating system executing on the client device and issued to an application window displaying a remotely executing application or desktop, the window management service may block a return from a local message handler. The window management service may then transmit the GESTURENOTIFY message to the server where the message is replayed for an application window corresponding to the application window of the client device. In some embodiments, the server may replay the message with a SendMessageTimeout( ) function call so that the application corresponding to the application window can set gesture configuration options, e.g. using the SetGestureConfig( ) function. The configuration is captured, transmitted to the client device and applied to the remote window displaying the application output. The window management service may then call the DefWindowProc function and return from the local message handler. In some arrangements, the remoting application may proactively call the GESTURENOTIFY on the application window on the server to trigger calling the SetGestureConfig( ) function. Thus, the configuration information may be determined in advance (e.g., of receiving touch input event notifications) and sent to the client device where it is cached.

Figure 8:
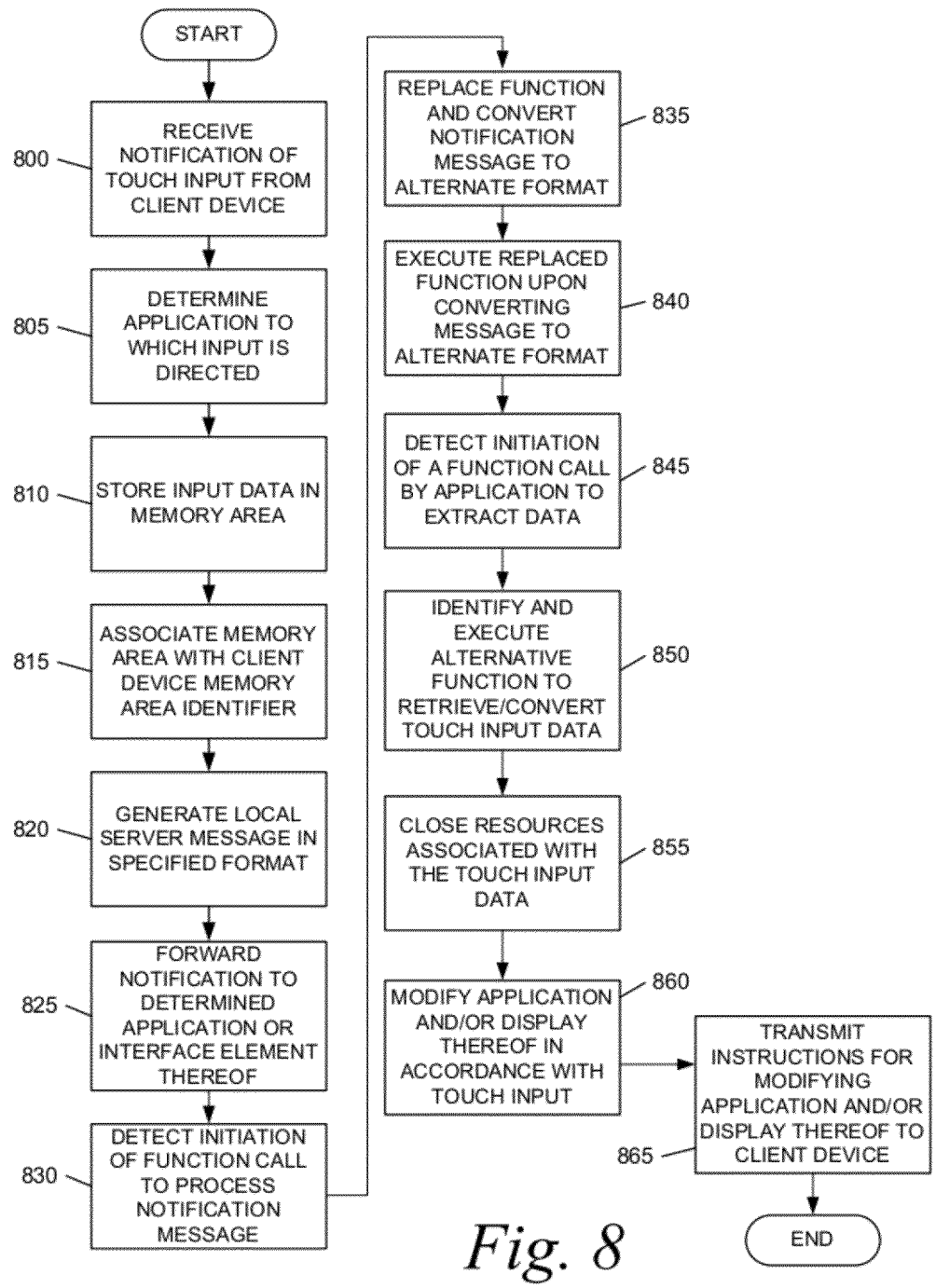
FIG. 8 is a flow diagram illustrating an example method for processing touch input for a remoted application according to one or more aspects described herein.

FIG. 8 illustrates an example method that may be performed by an application execution server to manage and process touch input events (in one example, within the overall process of FIG. 6). In step 800, the server may receive a notification from a client device to which an application is being remoted. The notification may specify touch input being received at the client device for the remoted application and may include touch information event information such as coordinates of an initial touch location, ID of the touch contact sequence and a primary touch location for multi-touch input, a width and height of the contact area, a direction of movement, a time of input, and the like. In some instances, the touch event information may include raw input data corresponding to a stream of digital data generated by the touch input hardware. In step 805, the server may determine the application to which the touch input event is directed. In a particular example, an application or window identifier may be specified in the touch input event information received from the client device and used to identify the appropriate application or application window. Upon receipt of the touch input event data, the server may further store the data in a shared memory space or location in step 810. Additionally, the server may associate the shared memory space or location identifier with a private or undocumented address generated by the operating system of the client device in step 815 so that the server may identify the shared memory space if the undocumented address is used in one or more notification messages to the identified application.

In step 820, the server may generate a local message in a specified format notifying the determined application of the received touch input event. In one or more examples, the client device or a digitizer executing on the server may create the notification message based on a touch or gesture notification message format such as WM_TOUCH or WM_GESTURE. The notification message may, in a particular example, duplicate or replay the WM_TOUCH or WM_GESTURE message generated by the client device, however replacing the undocumented address used by the client device to hold the touch input data with the server shared memory space or location identifier, which holds the transmitted touch input data at the server. In some examples, touch or gesture notification messages may be blocked by an underlying operating system if the message does not refer to an appropriate address space. Accordingly, the format of the notification message may be different from a native touch or gesture input notification message format to avoid being blocked by the operating system from transmission to the application as being an improper touch or gesture notification message. Upon creating the notification message, the server (or a remoting client executing thereon) may send the event notification and touch input information to a target application or window thereof in step 825. For example, the target window may be an application output window displaying application output generated by the application. In a particular example, if the application window displayed on the client device is a MICROSOFT EXPLORER window displaying application output generated by an instance of MICROSOFT EXPLORER executing on the server, then the target window is an application output window of the server that corresponds to that instance of MICROSOFT EXPLORER.

Alternatively or additionally, the server may generate the notification message by reverse-engineering the touch information received from the client device (e.g. the touch information in the undocumented memory structure.) In particular, the server may recreate the internal memory structure from the protocol (e.g., in a shared memory area rather than a private kernel memory area).

In step 830, the server may detect initiation of a function call by the application to process the notification message. For example, the application may call a DefWindowProc function to process the message. Because the DefWindowProc function might not understand the notification message since the notification message is provided in the specified format (e.g., a non-traditional gesture or touch input notification message format), the server may or remoting client thereof may replace the function call with an alternate function in step 835. The alternate function may be configured to convert the notification message into a format native to the underlying operating system and understood by the originally called function (e.g., DefWindowProc) as a gesture or touch input event notification. Once the message has been converted to the native or traditional input event notification format, the originally called function (e.g., the replaced function) may be executed by the application upon receipt of the converted message in step 840. For example, the originally called function may be configured to identify an action to be taken based on the contents and format of the notification message. In one example, the function may determine that the message corresponds to a touch input event notification and instruct the application to execute a further function to extract the touch input data.

Accordingly, in step 845, the server may detect the application initiating a function call to extract touch input data once the application has processed the notification message. In the above example where WM_GESTURE and/or WM_TOUCH are used as the notification format, the function call may correspond to GetGestureInfo( ) and/or CloseGestureInfoHandle( ). Because WM_TOUCH and WM_GESTURE messages generally include a handle or pointer to an undocumented, private (e.g., non-publicly accessible) memory area or structure where the touch input data is stored, the function call may be used to retrieve the touch event data. However, because the undocumented memory area or structure is located on the client device and not the server, executing the GetGestureInfo( ) and/or CloseGestureInfoHandle( ) function may result in an error. Accordingly, upon detecting the application initiating execution of a data retrieval function, the server may, in step 850, identify and execute another alternative function configured to access a memory space of the server (or another storage device) and retrieve the touch input data stored therein. For example, as noted above, the memory space may be a shared memory space provided on the server or another storage device. The memory space where the touch input data is stored may be identified based on the association stored between the undocumented address specified in the notification message and the memory address where the server stores the touch input data.

In some examples, a touch or multi-touch hook DLL managed by the remoting client application executing on the server or virtual digitizer may be injected into one or more or every process address space such that the DLL hooks all calls made by or to the undocumented memory structure. Thus, when one or more specified functions are called responsive to interpreting the notification message sent to the target window and application, the server may hook the function call and replace it with an alternative function. This alternative function may be specific to the remoting client application or a virtual-digitizer-specific function such as CTXGetGestureInfo( ) and CTXCloseGestureInfoHandle( ). In other examples, multi-touch DLL may hook all calls issued to obtain the touch input information and may replace these calls with system-specific implementations, e.g. replace GetTouchInputInfo( ) and CloseTouchInputHandle( ) with CtxGetTouchInputInfo( ) and CtxCloseTouchInputHandle( ), respectively. Thus, when the application calls the GetTouchInputInfo( ) function, the function may be replaced with the CtxGetTouchInputInfo( ) which converts the touch input formatted in a system specific format into a public format that the application can process. Similarly, when the application calls CloseTouchInputHandle( ), the function may be replaced by the multi-touch DLL with the CtxCloseTouchInputHandle( ) which frees up allocated resources.

According to some configurations, the touch or multi-touch hook DLL may use an AppInit_DLLs registry key method. In other arrangements, the touch or multi-touch hook DLL may use the CreateRemoteThread( ) or SetWindowHookEx( ) methods to inject the hook into processes that have a user interface. In still other arrangements, the touch or multi-touch hook DLL may also hook the SetGestureConfig( ) function and replace it with an alternative, system-specific function such as CTXSetGestureConfig( ) function. The SetGestureConfig( ) function may be called, for example, to notify an operating system of the supported memory structures by passing the operating system an array of GESTURE- CONFIG memory structures that define messages for a certain gesture. For example, memory structures may be passed to the operating system such as memory structures defining aspects of the following gestures: panning; rotation; inertia; etc. The structures may control aspects of the touch input or gestures such as allowing for horizontal but not vertical panning, or not permitting inertia. Upon sending the operating system these memory structures, the operating system may then be configured to support the particular touch input or gestures defined in the memory structures. In some examples, the server may remote SetGestureConfig/CTXSetGestureConfig( ) calls to the client device, and the client device may apply the memory structures passed during the function call to an operating system executing thereon. This is accomplished when a window management service of the client device calls the SetGestureConfig( ) function on the application window displayed. For example, if an instance of GOOGLE CHROME fails to support rotation, then the server may transmit a SetGestureConfig( )/CTXSetGesture Config( ) that includes a memory structure which identifies application output windows associated with that instance of GOOGLE CHROME as not supporting rotation. This function call is transmitted to the client device which in turn issues a local SetGestureConfig( ) function call having an argument that states that rotation is not supported, to an application output window displaying the application output generated by the instance of GOOGLE CHROME executing on the server.

In some arrangements, the function executed in step 850 may further be configured to convert the retrieved touch input information into a public format recognizable by applications executing on the server. When, for example, the CTXGetGestureInfo( ) function is called by an application, the function may convert the touch input information from the undefined memory structure format (e.g., a system-specific format) into a public GESTUREINFO structure. In one example, the system-specific format may include raw input data while the public format may correspond to application-compatible commands (e.g., pan, zoom, scroll, expand, etc.). Additionally or alternatively, the manner in which system-specific touch input information and data is processed may depend on the type of application to which the touch input is directed, a type of operating system of the client device or of the server and/or a type of client device on which the application is being displayed. For example, touch input may be translated into a first type of command for a first application or type of application and a second type of command for a second application or type of application.

After the touch input data is retrieved from the specified memory area and/or converted, a function such as the public CloseGestureInfoHandle( ) API may be called to close the resources associated with the gesture information handle in step 855. In one or more arrangements, the function for closing the resources may also be replaced with an alternate function configured to transmit a message to the client device to close the resources provided by the client side. Alternatively, in one or more arrangements, the client device frees the touch input resources shortly after sending the input to the server and does not rely on notification from the server to free its resources. Additionally, the memory areas used by the server may also be closed upon execution of the alternate resource closing function. Moreover, in step 860, the server may modify the application and/or a display thereof in accordance with the publicly formatted touch input information and commands. For example, if the touch input information is a zoom command, the server may expand the application window and/or the contents thereof. Additionally, the modification to the application and/or display thereof may be transmitted to the client device in step 865 in the form of instructions for modifying the remoted application display at the client device. In some arrangements, the server may further translate touch input based on an operating system on the client device or an operating system on which the application is executed. For example, the server may, in various examples, default to a touch function as defined in the operating system of the client device. Thus, a press-and-hold gesture may be interpreted as a delete function if the client device is operating iOS even though the application may be executing on WINDOWS, where by default press-and-hold is instead interpreted as a mouse right-click. In such a case, the server may translate the touch input into a touch input having the equivalent functionality in WINDOWS. For example, the server may translate the press-and-hold gesture into an up-left flick gesture, which by default means delete, or directly send a delete key input to the application. In another example, the server may default to a particular operating system such as WINDOWS. Accordingly, if the server is using iOS, touch input may be translated into WINDOWS touch input and functions based on WINDOWS touch input definitions. The server may store a table or mapping between touch input and functions for the various operating system and cross-reference the mappings as necessary. Users may also specify the configuration to use. For example, a user may specify that all touch input should be treated under an iOS scheme or a WINDOWS environment. The server may then translate the touch input, if necessary, based on the user selection of an operating system or preferred set of touch definitions. In a particular example, the user may define his or her own preferred set of touch input definitions and request that the server translate touch input according to those definitions.

Flick input may also be processed in similar fashion. For example, flick input may have one set of definitions at the client device or on a first operating system and have a second set of definitions at the server or on a second operating system. Accordingly, the user may configure what definitions are to be used. Alternatively, the definitions used may be controlled by the operating system on the client device or the server. In some configurations, flick input may be self-contained. That is, flick input may store input location data and other information within a flick input notification message rather than referencing an address space of the underlying system (e.g., as may be the case for touch or gesture inputs). Accordingly, flick input might not need to be processed in the same manner when remoted to the server. In one example, the flick input may be transmitted to the application without hooking a function call or replacing the address space with a shared memory space.

Figure 9:
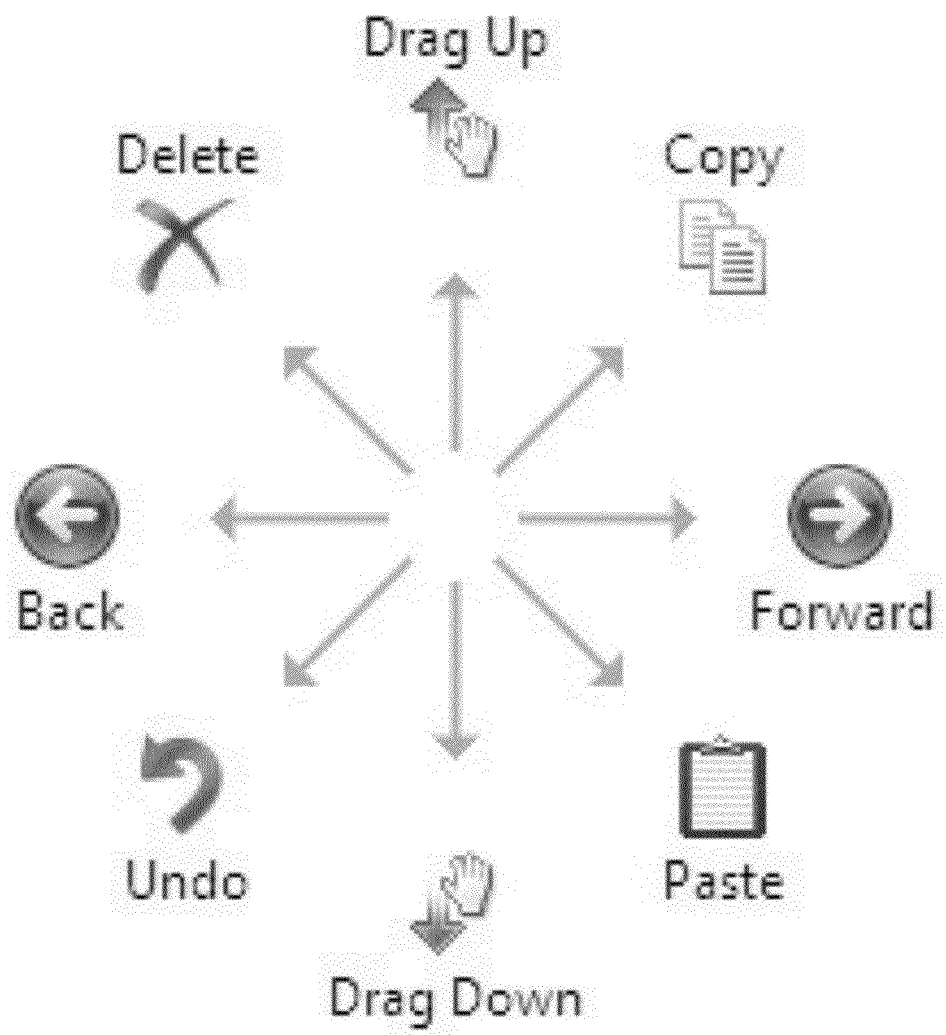
FIG. 9 illustrates an example function mapping for flick input according to one or more aspects described herein.

FIG. 9 illustrates a diagram illustrating examples of flick inputs and corresponding functionality. The mapping may be modified such that a down flick input, for example, may correspond to a minimize command, rather than a drag down command as shown in FIG. 9, while an up flick input may correspond to a maximize command, rather than a drag up command.

The remoting server, in some instances, may also be configured to convert touch input received from a touch-capable client device into non-touch input if the remoted application is not operating on a touch-compatible operating system. In an example, a tablet PC may transmit touch input to a remoting server using an operating system that is touch incompatible (e.g., does not understand touch input). Accordingly, the server may translate the touch input into mouse events or other types of operating system compatible commands (e.g., for modifying an appearance of the application, invoking a function of the application and the like) and forward those to the intended application.

Figure 10A:
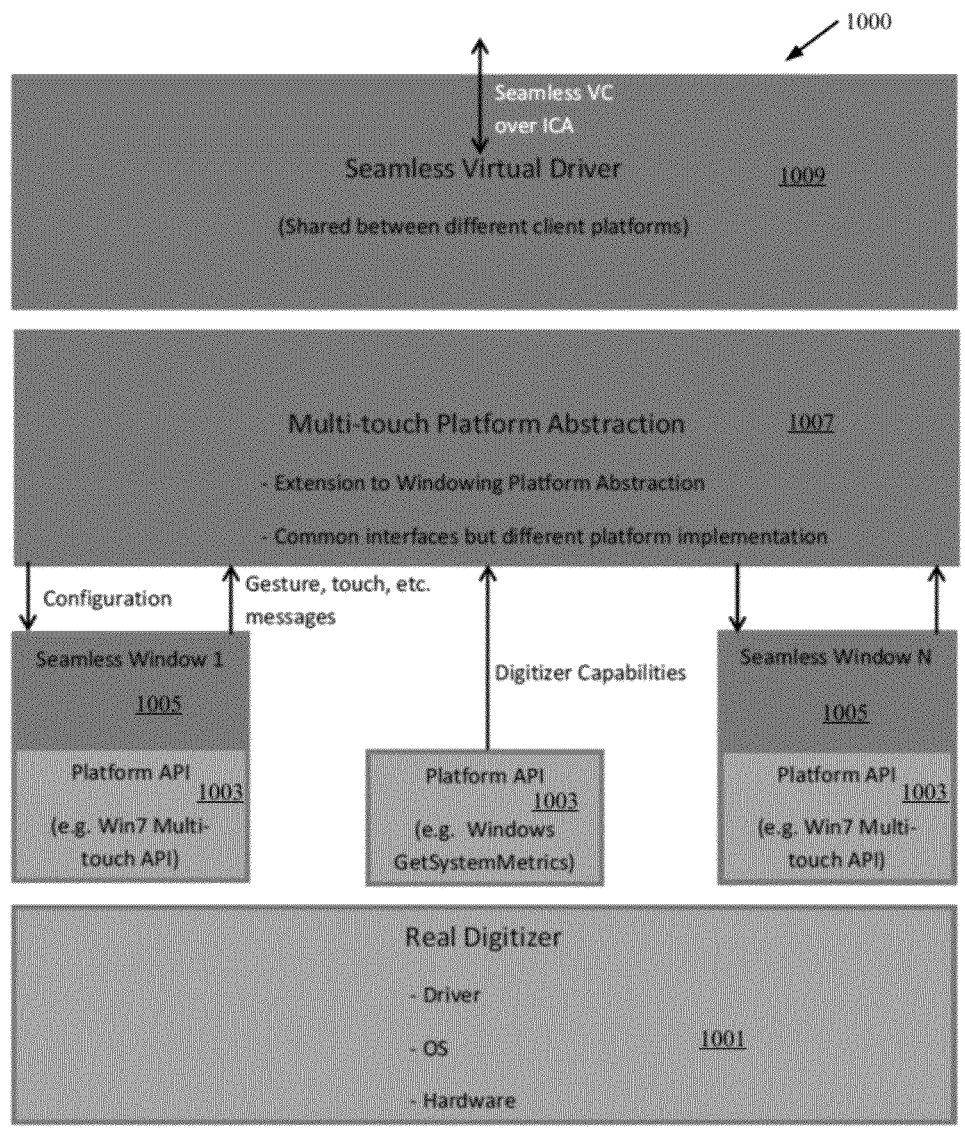
FIG. 10A illustrates an example computing environment in which one or more aspects described herein may operate.

FIG. 10A illustrates an example computing environment that may be used to support touch processing for remoted applications. System 1000 may include, as illustrated, input digitizer layer 1001, operating system or platform application programming interfaces (APIs) 1003, remoted application windows 1005, multi-touch abstraction layer 1007 and a virtual driver 1009. For example, input digitizer layer 1001 may include a driver for a hardware input element, an operating system underlying various applications to be executed and touch input hardware devices such as a touch screen or the like. The operating system may provide one or more APIs 1003 that allow applications to interface with the various functionalities and capabilities of the operating system. For example, the operating system may be WINDOWS OS and provide multi-touch APIs for receiving touch input data and converting the touch input data into gesture or other touch commands. Other APIs may include interfaces for retrieving system metrics or other system information. Remoted applications may operate above the operating system and digitizer layers 1001 and invoke various functions for creating windows such as windows 1 . . . N 1005 to display the remoted application. In one example, a remoting client may execute on the client device and invoke window creation functions using the platform APIs 1003 to create one or more windows for display application output and data. Touch input including multi-touch gestures, single touch input, flick input and the like may then be abstracted out at the multi-touch platform abstraction layer 1007 and transmitted to a server using driver 1009. The multi-touch platform abstract layer 1007 may also return application output and instructions for modifying an appearance or functionality of an application. In one or more examples, the platform APIs 1003 may also be used to retrieve device capability information such as type of input recognized, detectable types of input (e.g., single touch vs. multi-touch), functions supported by the operating system and the like.

Figure 10B:
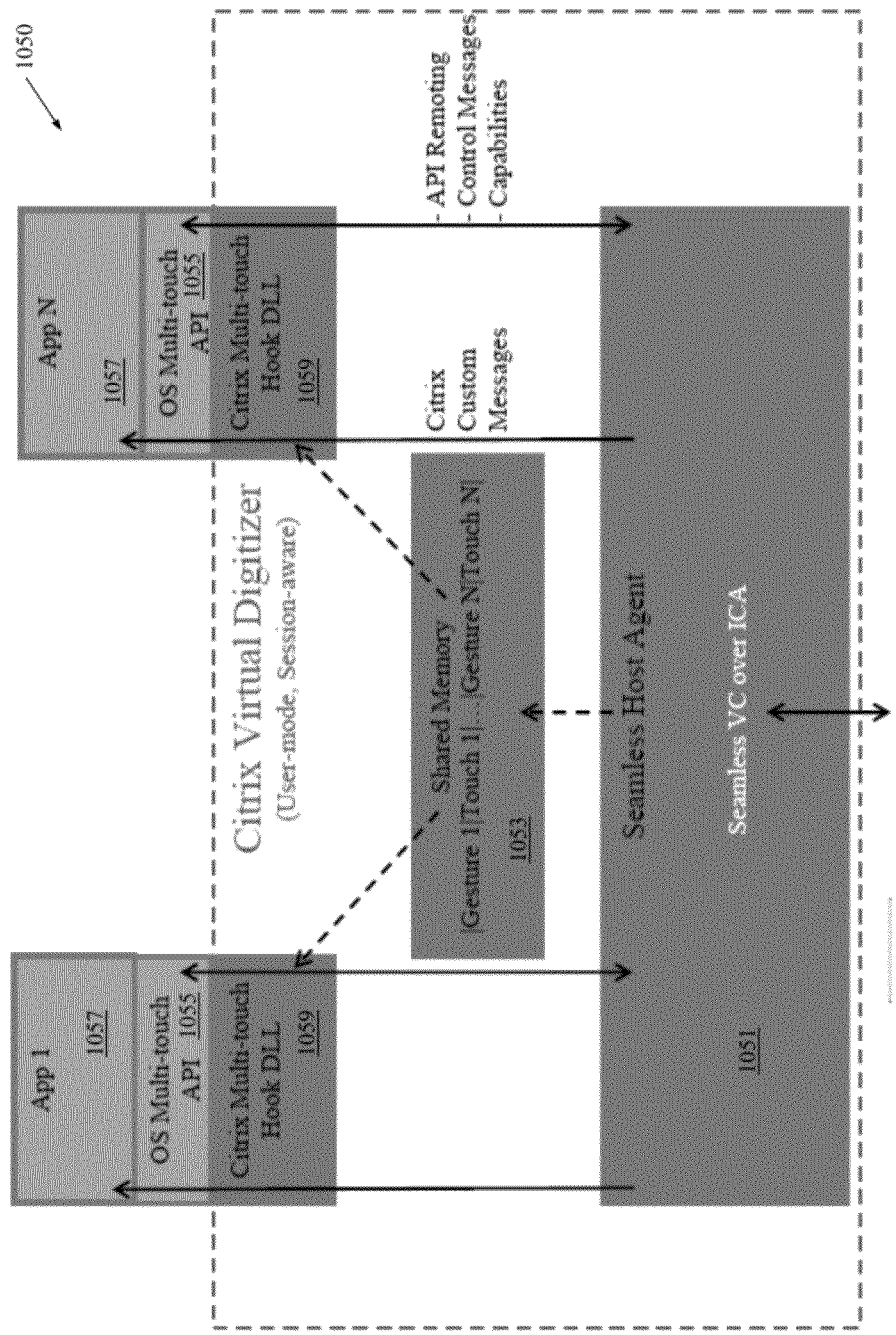
FIG. 10B illustrates another example computing environment in which one or more aspects described herein may operate.

FIG. 10B illustrates an example block diagram for a server device configured to execute applications for one or more client devices. As illustrated, server 1050 may include a host agent 1051 configured to interface with a virtual driver or client agent such as virtual driver 1009 of FIG. 10A. The host agent 1051 may further be configured to interact with memory 1053 in which touch input data may be stored and accessed as well as with operating system APIs 1055 and applications 1057. In one example, the memory 1053 may be accessed and/or otherwise used by one or more application or function hooks such as hook DLLs 1059. As described herein, in one example, the host agent 1051 may transmit a custom message (e.g., a message in a specified format) notifying an application (e.g., one or more of applications 1057) of a touch input event. The application may initiate a function call to retrieve the touch input data using an underlying OS API 1055. However, the host agent 1051 may intercept these function calls and replace them with the hook DLLs 1059 configured to access memory 1053 where the touch input data is stored.

All applications might not be configured to accept touch input. However, users may want to use touch input regardless of the configuration of the application. Accordingly, in some examples, the touch input may be converted into mouse events or other types of input events for an application that is not configured to receive and process touch input.

Figure 11:
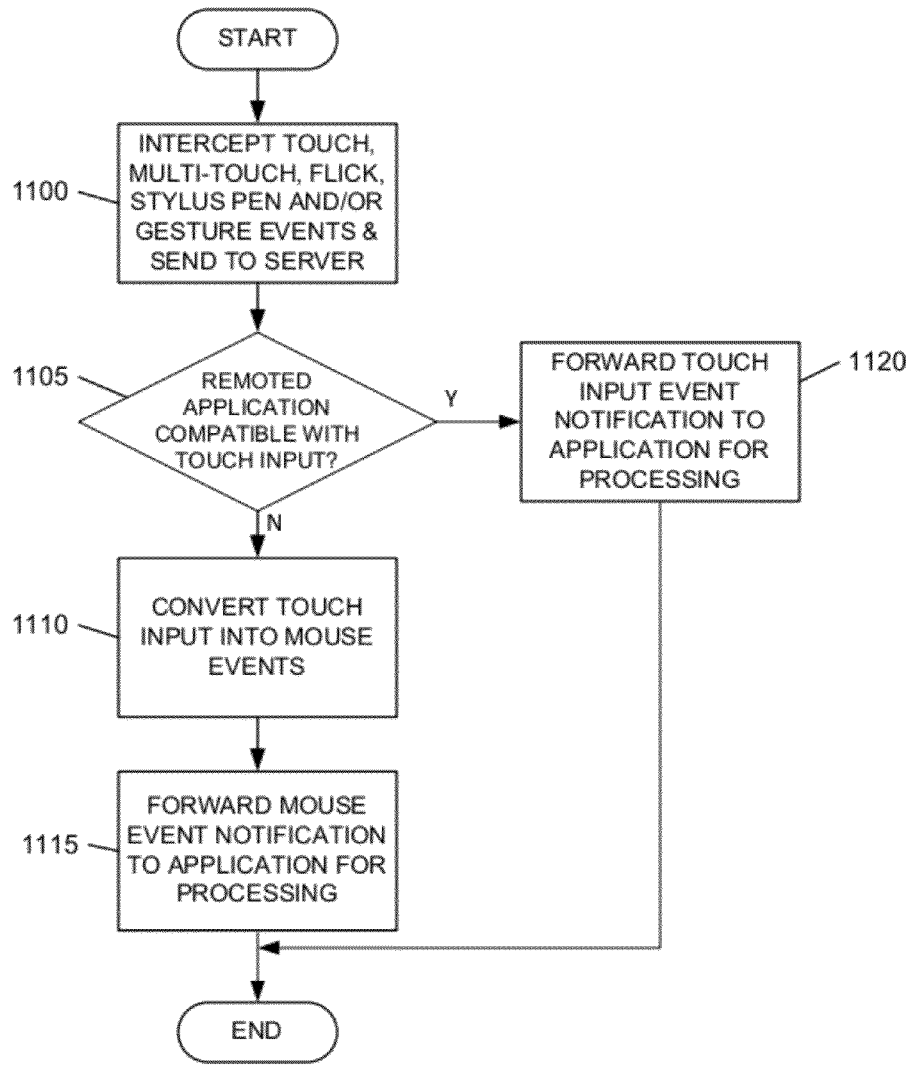
FIG. 11 is a flow diagram illustrating an example method for processing touch input events for legacy applications according to one or more aspects described herein.

FIG. 11 illustrates an example method for processing touch input for non-touch compatible or non-touch enabled applications. For example, in step 1100, a window management service or other application of a client device may intercept all touch, multi-touch, flick, stylus pen input and gesture events and send those events to a server where they may be replayed for the corresponding remoted application. The server may determine in step 1105 whether the remoted application is compatible with touch input. For example, the server may make this determination based on whether the application has registered as a touch input compatible application. Applications may register a window as capable of receiving raw input such as WM_TOUCH messages. In one example, a touch multi-touch DLL may hook a RegisterTouchWindow( ) API and replace it with a system specific CtxRegisterTouchWindow( ) API. When an application registers a window as capable of receiving raw input, e.g. issues a RegisterTouchWindow( )/CtxRegisterTouchWindow( ), the server may forward the call to the client device which in turn advertises a corresponding window as touch-capable by calling the local RegisterTouchWindow( ) API. This function call may include any number of configuration parameters, such as: turn off coalescing and turn on fine touch so that the coalescing of raw touch input becomes responsibility of the handling application; disable palm rejection which blocks messages from accidental palm contact; and any other configuration parameters. Similarly, the touch or multi-touch hook DLL may hook a UnregisterTouchWindow( ) API and replaces it with a system specific CtxUnregisterTouchWindow( ) API. The server may intercept this call and transmit it to the client device, causing the client device to advertise that a window no longer requires or accepts raw touch input.

In instances where the remote application cannot handle touch input, the input or messages may be propagated to a default window procedure which causes an operating system executing on the server to convert the touch input into mouse events in step 1110 and forward the mouse events to an intended application in step 1115. For example, the server may store a mapping between types of touch input or gestures and different types of mouse events/inputs. In a particular example, a vertical panning gesture may cause the operating system to detect scroll bars and corresponding Ctrl-Scroll Wheel command generation. The operating system can also detect editable areas in the application window and upon receiving the touch input may cause a touch keyboard option, etc. to be generated and displayed. For example, the server may convert the touch input into a mouse-click event directed to an editable area. The mouse-click event on the editable area may then cause the virtual keyboard or other input element to be displayed and activated.

If the remoted application is capable of handling touch input, the server may forward the touch event notification to the remoted application in step 1120 for processing as described in further detail herein (e.g., according to the process of FIG. 8).

In some configurations, instead of or in addition to hooking replacement or alternative functions into a system-specific touch information retrieval function, the server may perform manipulation to extract the raw touch input and forward it to the appropriate application window. For example, the server may reverse-engineer the undocumented data structure in which the raw touch input is stored by the underlying operating system. This can include recreating a windows-internal memory structure that approximates the undocumented data structure, then sending the WM_TOUCH message to the appropriate application window where the message points to the newly created memory structure. Another method may include re-creating the touch input information in terms of either an array of public touch input structures, or in terms of a system-specific format, e.g. a CITRIX format. Upon recreating the touch input, the remoting server may send the WM_TOUCH message to a target window. In a particular example, the server may invoke a hardware driver that executes within the operating system and emulates touch input hardware data. The multi-touch hook DLL can also hook the GetRawInputDeviceInfo API which based on the device handle previously communicated by the client can be used to retrieve information about the input device, e.g., name, type, device-specific info.

Moreover, in one or more arrangements, an underlying operating system may provide one or more public interfaces or functions for creating touch or gesture input data in a native space and format. For example, an operating system may provide a function for creating a private address space in which touch or gesture input data may be stored and later retrieved by other public functions and calls. Thus, instead of or in addition to application/function hooks and/or emulation drivers, functions and interfaces provided by the operating system may be used to create touch or gesture input data and store that data in operating system designated locations. In a particular example, on the Windows 8 Server operating system, the remoting client 510 may use the raw touch input injection APIs, such as InitializeTouchInjection and InjectTouchInput, and provide an array of POINTER_TOUCH_INFO structures, containing information about pointer type, e.g., touch or stylus pen, contact ID, pixel location, etc. Applications running in the Windows Runtime (WinRT) Platform on the server, such as Metro Style applications, may then seamlessly retrieve the touch input using the PointerPoint interface. For example, applications may retrieve common data such as contact ID, pixel location, and can also retrieve input-specific data from a property bag. Metro Style applications running on the server may also seamlessly use the GestureRecognizer interface to register to receive events about gestures and configure the gestures themselves. Further, applications may use the PointerDevice interface to retrieve various capabilities and properties, e.g., the type of input device, weather it is integrated or external, maximum input count, or get the supported HID usages of the device. Similarly, applications running in the Win32 platform on the server (Desktop applications), may handle the WM_POINTER message (the equivalent of the WinRT PointerPoint) and retrieve the raw input data using the GetPointerInfo( ) API and related functions. Desktop applications can also use the InteractionContext interface to retrieve componentized gesture recognition, and can also use the Win32 Pointer Device APIs to query the virtual pointer devices in the server environment.

The function call replacement features of FIG. 8, the hardware driver touch input event creation features and the public operating system interface features may be used in conjunction with another or may be used exclusively of the other techniques. For example, function call replacement may be used in some circumstances while hardware driver creation or public operating system interfacing may be used in other circumstances. In a particular example, function call replacement may be used in situations where touch input may require special gesture translation between the client device and the server, direct gesture injection, translation into a mouse event or other non-touch event.

Figure 12:
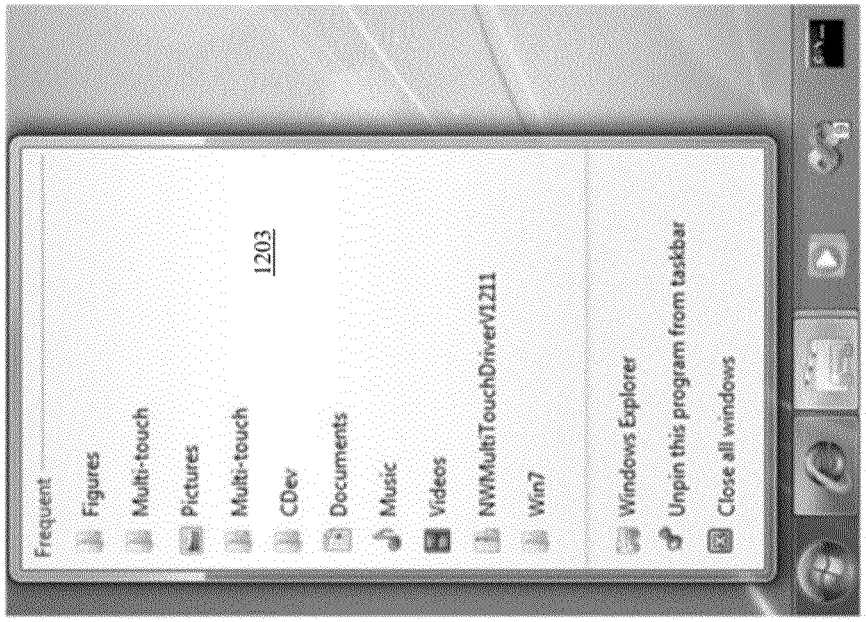
FIG. 12 illustrates example user interfaces that may be provided for input-aware and non-input-aware applications according to one or more aspects described herein.
Figure 12:
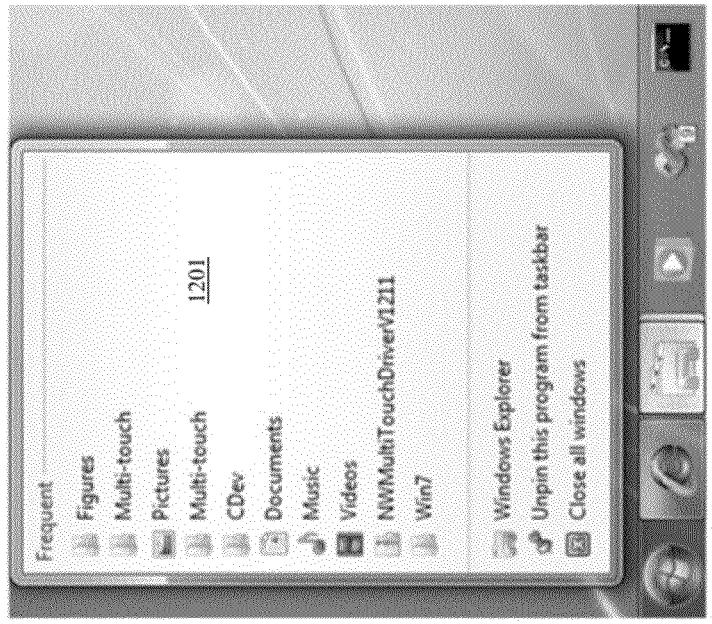

Some applications may be input-aware but not touch-compatible or touch-aware. As such, such applications may modify the application display or invoke various application functions based on the source of the input rather than the actual type of input received. For example, if an application is not compatible with touch input, touch input received may be converted to mouse events for the application. The application may modify the display or invoke a function based not only on the mouse event received, but also based on the source of the input such as a touch-sensitive display, a mouse, a keyboard, a touchpad and the like. Accordingly, if the source of the touch input corresponds to a touch input device, the application may modify the display in a manner specific to touch input sources or invoke a function particular to touch input sources despite the input received by the application being a mouse event. In a particular example, menus or input areas may be expanded to facilitate touch input upon detecting the source of an input event being a touch input device. In contrast, a mouse event from a mouse input device might not elicit such expansion of the menu or input area. In some configurations, mouse events may always be sent in parallel to gesture/touch events. FIG. 12 illustrates an example interface for modifying an input-aware application in response to determining the type of input received. For example, when the input received is mouse input, the Destination List is smaller (e.g. the left list 1201 is smaller than the right 1203). However, when the input received is touch input, the Destination List is larger (e.g. the right list 1203 is larger than the left 1201). In some examples, determining the type of input may include calling the GetMessageExtraInfo( ) function to obtain additional information associated with a message or input. Additionally or alternatively, an operating system may tag mouse movements with a special signature. Still further, applications may mask the extra information with a mask such as 0xFFFFFF80. Thus, when the resulting value is, for example, 0xFF515780, then the input may be considered touch. In some examples, the remote applications may be input aware and may therefore modify their user interface when a particular type of input is received. In some embodiments, an application may be input-aware, but might not be gesture-aware. In such instances, the gestures may be propagated to a default window procedure where the gestures are modified into mouse events. Although the gestures are handled by a default window procedure, they may still be tagged as touch input. Thus, the application or desktop may still determine that the input is touch input and can modify its user interface accordingly.

Figure 13:
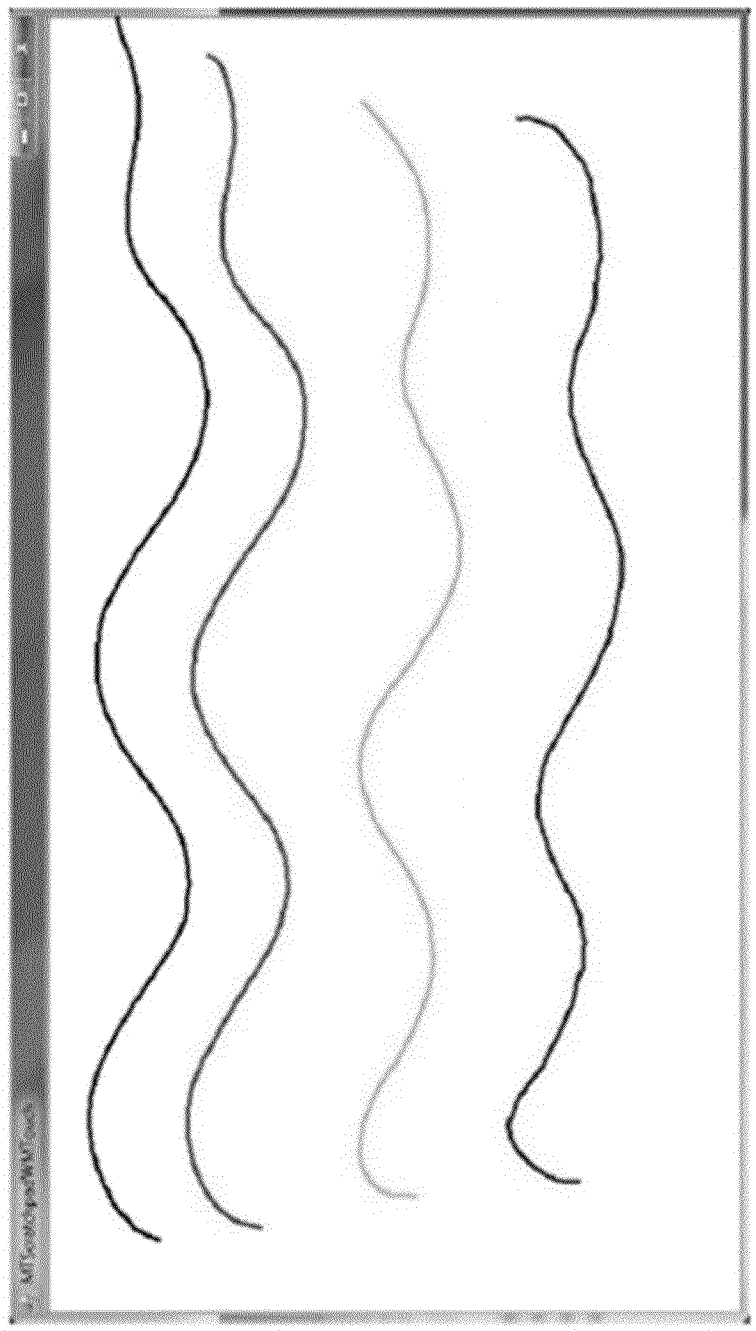
FIG. 13 illustrates an example user interface displaying multi-touch application output according to one or more aspects described herein.

The server executing the application may also invoke various functions of the application or modify the application display without requiring the application to be input-aware. Thus, if the server is aware that the input source is a touch sensitive device, the server may automatically expand the application or a portion thereof (e.g., an input field) even though the application might not be touch-input compatible. In particular, if the server recognizes that the application is not touch compatible, the server may transmit a mouse event to the application while instructing the application display to expand the input area. FIG. 13 illustrates an example user interface including a scratch pad application window supporting multi-touch. The multiple lines on the scratch pad correspond to different touch input, e.g. four fingers or four styluses. Further, the multiple lines illustrate inputting multiple touch events simultaneously. The methods and systems described herein can support any number of simultaneous multi-touch inputs. In some examples, this support may be limited only by the hardware of the mobile device 102, the operating system of the mobile device 102 or the drivers of the mobile device.

Figure 14:
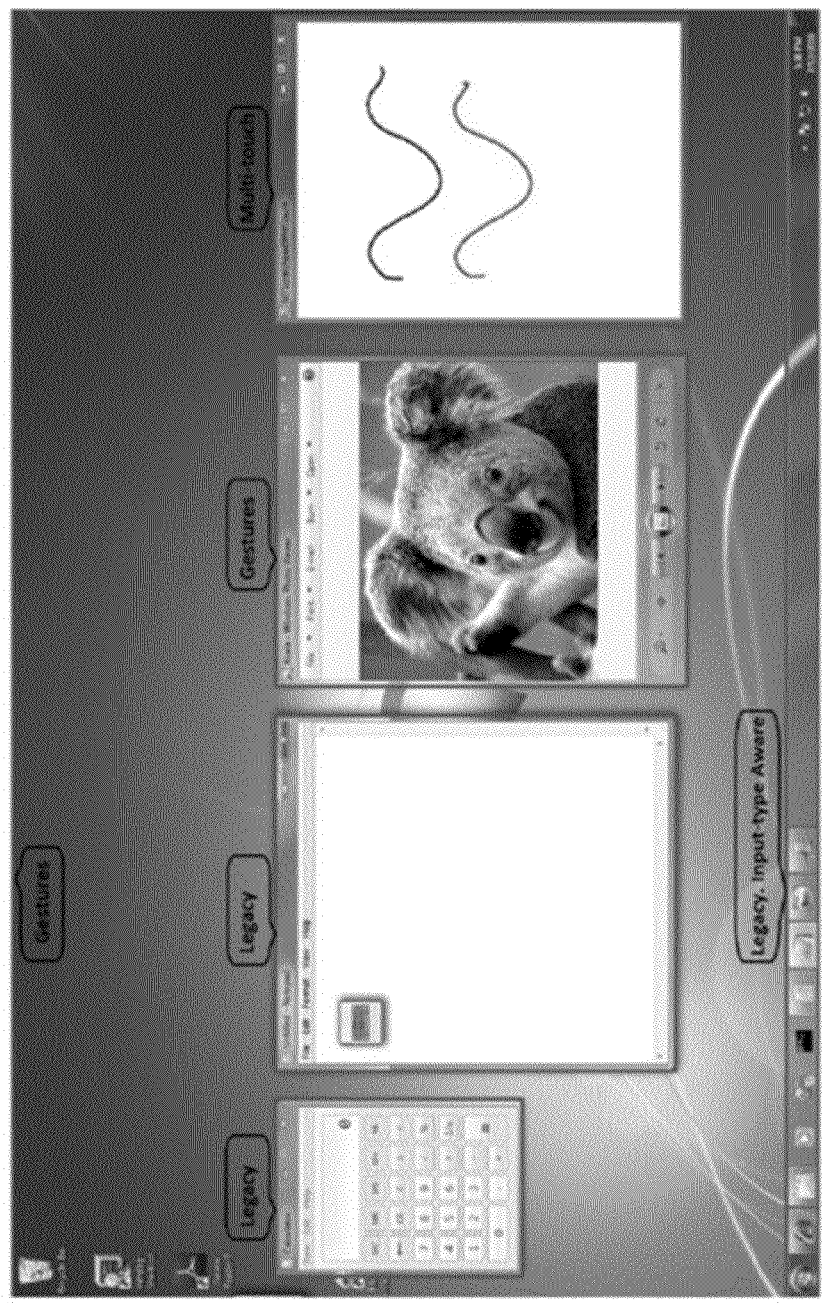
FIG. 14 illustrates an example user interface displaying applications in various modes according to one or more aspects described herein.

FIG. 14 illustrates an example user interface displaying an application of various methods and systems described herein to a desktop environment. In one example, the desktop environment can include both windowed, full-screen and multi-monitor window modes. Touch can be negotiated on a per window basis, thus different levels of touch can be allocated to different windows in the desktop and windows within the desktop can be modified while other windows remain the same.

Figure 15A:
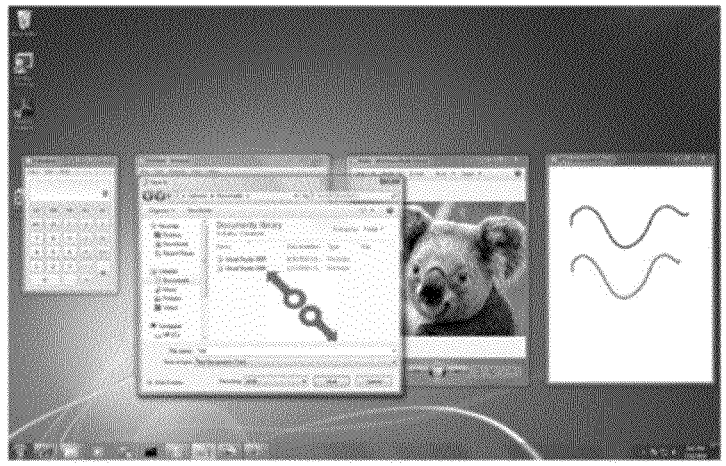
FIGS. 15A and 15B illustrate example user interfaces displaying a zooming effect for legacy applications according to one to more aspects described herein.
Figure 15B:
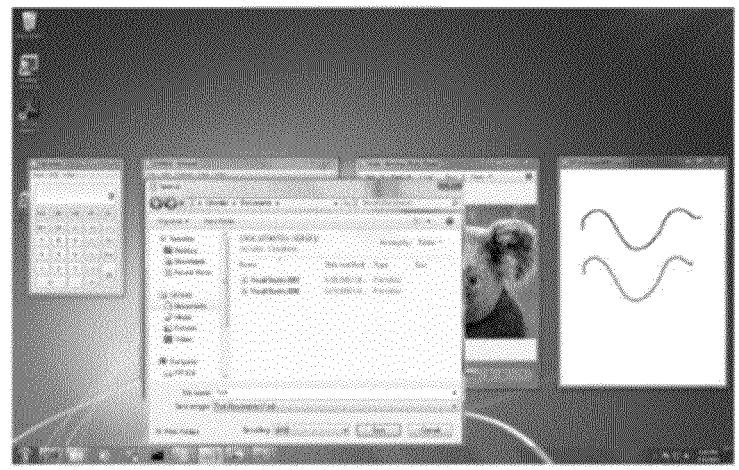

FIGS. 15A and 15B illustrate example user interfaces displaying results of implementing zooming in legacy applications and in a desktop environment. In some arrangements, a window management service such as window management service 206 may expand windows having touch focus using StretchBitBit and can do this for both legacy applications and desktop components. FIG. 15A, for instance, illustrates a manner in which a zoom-in functionality of a multi-touch environment may be extended to a legacy application, which does not natively support zoom. FIG. 15B illustrates a manner in which a single application window, e.g. the File Save As window, displayed in a desktop can be re-sized or zoomed-in on while the other application windows in the desktop remain the same size. This can be accomplished by zooming in on an application window having touch focus. In some embodiments, when an application window supports zooming, the zooming technology provided by the window management service can be turned off so that the application window may function per usual and according to its configuration.

Figure 16:
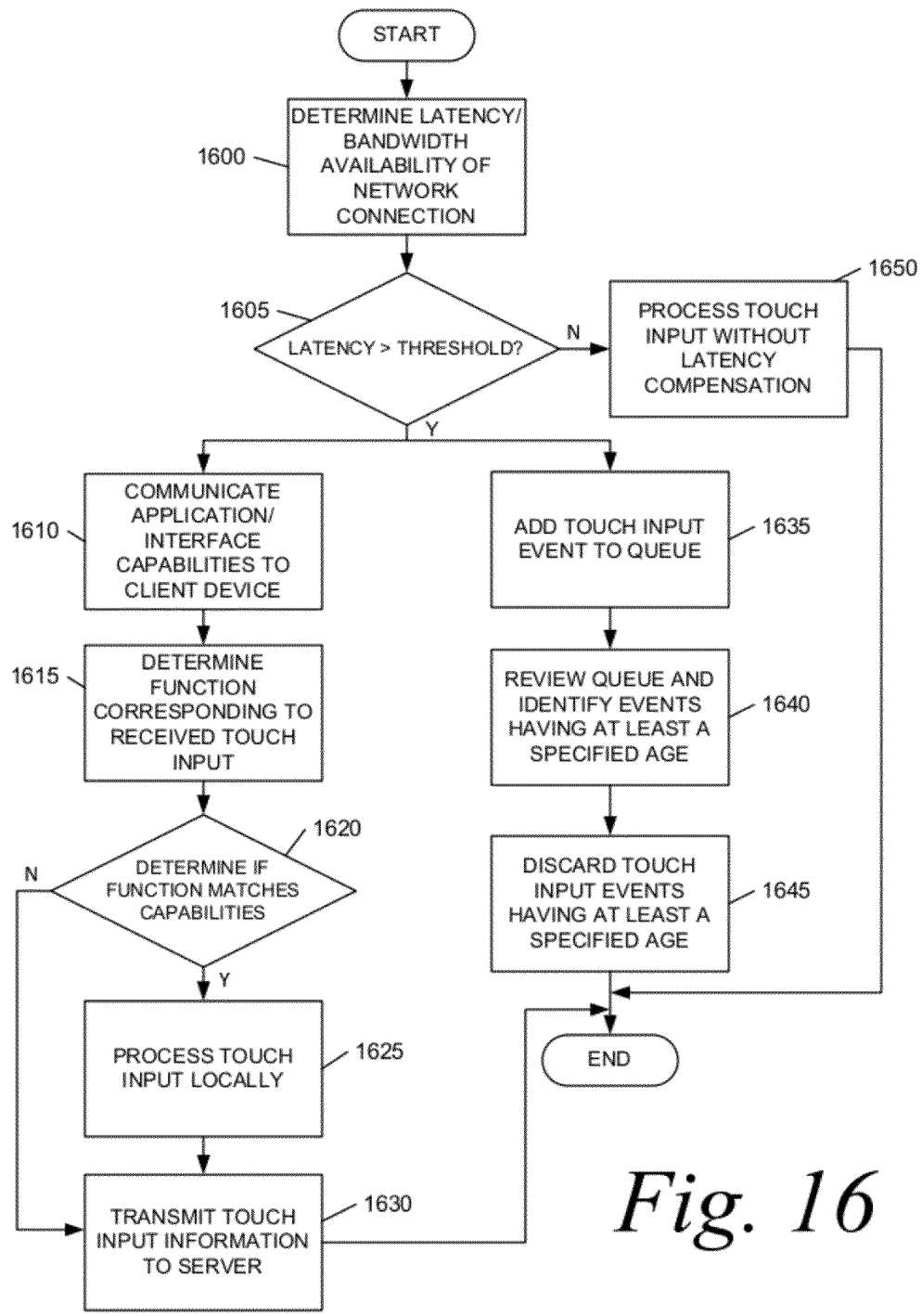
FIG. 16 is a flowchart illustrating an example method for addressing latency issues in processing touch input according to one or more aspects described herein.

Because aspects described herein operate over a network (e.g., between a client device and a remoting server), latency may pose an issue as well as low bandwidth. Accordingly, remoting touch input and gestures may include latency compensation processes. FIG. 16 illustrates an example process by which zero-latency or substantially zero-latency may be achieved in an environment having a high latency connection. In step 1600, the client device (receiving the remoted application) may determine a latency (e.g., transmission time) of a network connection between the client device and the server providing a remoted application. In one example, the client device may send a message such as a ping request to the server to determine a round-trip-time associated with the message. The latency may then be determined based on the magnitude of the determined round-trip-time and may be determined upon receipt of an input event, a specified number of input events, based on a specified interval or on aperiodic schedules. For example, the latency may be determined and/or refreshed every 30 seconds, every 5 seconds, every 10 seconds, on a schedule where a second determination is made 5 seconds after the first and a third determination is made 10 seconds after the second and/or the like. In step 1605, the client device may determine whether the latency is greater than a specified threshold. The threshold may be set, for instance, at a value of round trip time at which a user may experience significant lag between providing the touch input and receiving a response in terms of the application display being modified according to that touch input. If the latency is below the specified threshold, the client device may process the touch input without latency compensation (e.g., forwarding notification of the touch input event to the server) as show in step 1650. If the latency is above the specified threshold, the client device may use one or more of multiple processes to compensate for the latency.

A first latency-resolution technique may include processing touch input locally at the client device. For example, a window management service or other client application executing on the client device may provide local feedback (e.g., display modification instructions) to application windows displaying remotely executing applications. This local feedback can be determined based on historical or approximated information and in some instances can be followed by true feedback from the remotely executing application. Configuring a window management service or other client application to be able to respond locally may include communicating to the window management service or other client application the capabilities of a window and the application's ability to handle specific gestures, as shown in step 1610. However, the communication of the application/window capabilities may be communicated prior to determination of latency or at other times in the process. In step 1615, the client device may determine an application function corresponding to the received touch input. For example, the client device may call a gesture API of the underlying operating system to interpret the raw touch input into a gesture command.

In step 1620, the client device may then compare the application function to the determined application capabilities to determine if the application supports the touch input command. If the application is compatible with the touch input command, the client device may process the input command locally in step 1625. For example, the client device may, if a window can handle scrolling and zooming and it is determined that the network latency is above a predetermined threshold, call and/or execute the function corresponding the touch input substantially immediately upon detecting the touch input or gesture. In some examples, the window management service or other client application may handle the gesture locally using graphics from a video or image buffer and by performing StretchBitBit or BitBit operations on the client area of the application window. The non-client areas may remain intact and untouched. For example, the window management service or other client application could zoom in on a picture displayed in the application window but could permit the title and borders of the window to remain intact. Additionally, in step 1630, the client device may further transmit the gesture or touch input to the remoted application at the server so that the remoted application is updated at the execution source/location. Once the remote application handles the gesture, the remote application can transmit the application output to the client device which receives the application output and updates the application window to display the application's true response to the gesture input.

In cases where the application does not support the touch input command or a function associated therewith, the client device may transmit the touch input information to the server (as in step 1630) for handling remotely without local processing. Alternatively, the client device may discard the touch input without processing the touch input locally and without sending the input to the server.

Another latency or session-interactivity resolution process may include queuing and tossing touch input events in low-bandwidth and/or high latency conditions. For example, in step 1635, the client device may add touch input events into a queue to be sent to the server. At specified times, the client device may review the queue (e.g., as shown in step 1640) to identify touch input events having at least a specified age. For example, the age of each touch input event may be defined and/or determined by an amount of time the touch input event has been in the queue, an amount of time since the touch input event was received and the like. The client device may then discard touch input events having at least a specified age in step 1645. For example, the client device may discard all touch input events having an age of at least 1 second, 30 milliseconds, 2 seconds, etc. Alternatively or additionally, the client device may remove touch input events in the queue based on a maximum number of touch input events to be included in the queue. Accordingly, if the maximum limit of touch input events to be stored in the queue is 10, the client device may discard the oldest touch input event(s) to reduce the number of events in the queue to 10. Queuing and discarding may help to coalesce raw touch input events to prevent overloading a transmission pipeline and to preserve the interactivity of a remote session in low-bandwidth conditions or when the speed of application execution (e.g., of touch input events) is slow. For example, in some cases, applications might be slow in interpreting the touch input, even though bandwidth to the server may be sufficient, e.g., if the server load is high, in which case the server might coalesce the input in order to preserve interactivity of the application. Without coalescing, the application might be busy digesting a potentially long queue of stale gestures and reacting with a delay to the user.

Arbitration of touch input between a client device and a server device may also be performed for non-latency based issues. For example, the client device may determine which device will process the touch input (server or client) depending on factors such as operating system compatibility, rules specified by the client, the server or the user, application specified rules and the like. In some examples, the touch input may be processed both by the client device and the server. In a particular example, a particular gesture (e.g., a four finger wipe) may correspond to switching between executing application. This gesture may be processed by both the client device and server to result in seamless switching between application executing locally on the client device and remoted applications executing on the server. In other instances, a particular type of touch input might never been remoted (e.g., sent to the server) or may always be sent to the server. The various rules for where touch input is to be processed might also depend on whether the client device is compatible (e.g., understands) the touch input. If not, the touch input may be transmitted to the server instead. Further, users may wish to use local or remote UI elements or interaction rules. Accordingly, the user may specify that certain types of touch input (or all touch input) is to be processed locally or remotely.

In some arrangements, an application or system may wish to determine the touch screen capabilities of a device or other type of hardware such as an input digitizer, e.g. an input digitizer of the client device. Accordingly, in one example, a window management service may use a GetSystemMetrics API with index SM_DIGITIZER to query the capabilities of the input digitizer, such as support for multi-touch, pen or touch, whether the device is ready, whether it is integrated or external, how many simultaneous inputs are supported. In some embodiments, the received information may inform the window management service about the touch capabilities of the mobile device. These capabilities can be transmitted to a server where they may be used by remote applications to modify their user interface according to the mobile (or other client) device's capabilities. In some embodiments, this may include having the multi-touch DLL hook a GetSystemMetrics API and replace with a system specific API which can query the mobile device's capabilities. Upon querying for the capabilities, the server may receive the capabilities and make them available to applications executing on the server.

According to another aspect, an operating system may provide applications that facilitate manipulation and inertia processing. Manipulation may include processing of multiple/complex transformations at the same time, e.g., rotation, scaling, translation/panning with any number of fingers at the same time using a 2D affine transformation matrix. An application may feed raw data into a manipulation processor and receive transformation matrices. Gestures may be boiled down into individual manipulations. Inertia may be used in various ways, including to specify deceleration speed or end point, boundaries, etc. The inertia API may generate fake events from a simulated user but they may be handled by the application in the same way as real events. Default manipulation and inertia applications may be replaced by applications that customize the manipulation and inertia handling. In some examples, inertia and manipulation can be handled on the mobile (e.g., client) device, while in other examples, inertia and manipulation can be handled on the server.

In some embodiments, the methods and systems described above may be ported to multiple client platforms such as: iPhone, iPad, Android, Blackberry, etc. Just as the methods and systems described herein can be modified to customize a user's experience, so can the features on a client platform be modified. For example, show the local/native client touch keyboard, then remote the keystrokes to the host, as opposed to showing the keyboard in the remote session itself and remoting the touch events. The capabilities of the methods and systems described herein can vary depending on the client/mobile device. For example, the client multi-touch platform abstraction may have to do its own gesture-recognition from raw events if the OS does not natively support it. Also, it may have to disable local processing, e.g., zooming/panning, and delegate it to the remote session.

Remoting of applications and touch input may further include support for coordinate translation to resolve discrepancies in screen locations, sizes, resolutions and the like between the client device and the server. An application output window displayed on a client device (e.g., mobile device 102) and displaying application output generated by a remotely executing application, e.g. a seamless window, may in some instances assume a null initial position of [0,0]. Further, the seamless window may create a remote session that has substantially the same resolution as the display of the client device. This resolution, in some embodiments, may be the combined desktop resolution for multi-monitor environments. When the application output window displays portions or a whole remote desktop, the application output window may have offset coordinates relative to the local physical display. In some instances, this may be true for both windowed and even full-screen remote desktop (in the case of a multi-monitor environment.) Accurate handling of multi-touch and gesture input can therefore require the client device or the window management service executing thereon to translate physical screen coordinates into logical screen coordinates before sending them to the host as part of gesture or raw touch events. For example if the physical coordinates of a gesture or touch input are [PhysicalX, PhysicalY] and the remote desktop's top left corner is at physical offset [DesktopX, DesktopY], then the logical coordinates within the desktop, which are sent to the host, are [PhysicalX−DesktopX, PhysicalY−DesktopY].

In addition to coordinate translation, the client device or the window management service may perform coordinate scaling. For example, for a gesture or touch input issued to a window that has a position from the top left corner at [WindowX, WindowY] and scaled at a factor [ScaleX, ScaleY], the resulting logical coordinate sent to the host can be: [WindowX−DesktopX+(PhysicalX−WindowX)/ScaleX, WindowY−DesktopY+(PhysicalY−WindowY)/ScaleY]. Similar translations and scaling can be performed for panning input or scaling a desktop window to fit a client device window size. Coordinate translation and/or scaling may be performed by the client or by the server or both.

According to one or more configurations, the methods and systems described above can further support passthrough technology. Passthrough technology includes permitting data to pass through multiple protocol hops during a transmission between a client device and a remoting server. According to some aspects, the methods and systems described herein can support passthrough technology without any additional modifications. For example, a client running in a session can act as another application which receives gesture or multi-touch input and can relay the input to another session or another client executing in the other session. The digitizer capabilities can be presented to applications in all sessions including subsequent network nodes (e.g. protocol hops).

In some arrangements, the methods and systems described above may further or alternatively support three-dimensional image remoting, e.g. three dimensional images and desktops that use three dimensional images such as Aero technology. In these embodiments, three dimensional drawing commands can be transmitted from the server to the client device, and the window management service may handle rendering three dimensional images from the three dimensional drawing commands. In some embodiments, the window management service can draw the three dimensional images on an off-screen surface and then inject the surface or rendered images into a three dimensional command stream. These embodiments can require mitigating the lack of a discernible association between surfaces and windows in a three dimensional command stream. In some embodiments, remoting three dimensional images can include providing raw touch input support by remoting a raw, touch input stream to the server where server can use the coordinates of the touch input to determine on which corresponding host window the input should be replayed. In some instances, this support can include translating raw touch events into gestures for those application windows that are touch-incapable.

According to another aspect, multiple users or clients devices may interact with a single application session (e.g., a single instance of an application executing at the remote server). Accordingly, the users and client devices may collaborate on a document or image or other application function. The input received from the multiple users and/or client devices may include touch input, stylus pen input, mouse input, keyboard input, joystick input and the like. The various inputs from the users may be sent to the server and resolved to determine a modification to the application display that will be transmitted to each of the users. In one example, one computer (e.g., client device) may shadow another computer, e.g. CITRIX SMART AUDITOR, CITRIX SMART AUDITOR PLAYER, CITRIX XENAPP, OR CITRIX XENDESKTOP. In these embodiments, an application can be used to replay application content generated during a remote or local user session. For example, a user can log into a user session at the remoting server and an application executing within the user session can record the application output generated by applications executing within the user session. In some embodiments, the recorder can store the recorded application output for future review or can substantially simultaneously transmit the recorded output to another session or computer where the recorded output is displayed. Viewing application output in real-time as it is generated can sometimes be referred to as shadowing. When multiple users shadow another user's session, shadowing can be configured to permit the multiple shadow users (shadowers) to interact with applications executing within the shadowed user (e.g. shadowee). Accordingly, in some arrangements, shadowing may be used to provide collaborative functionality between multiple users in the same application instance and user session.

Figure 17:
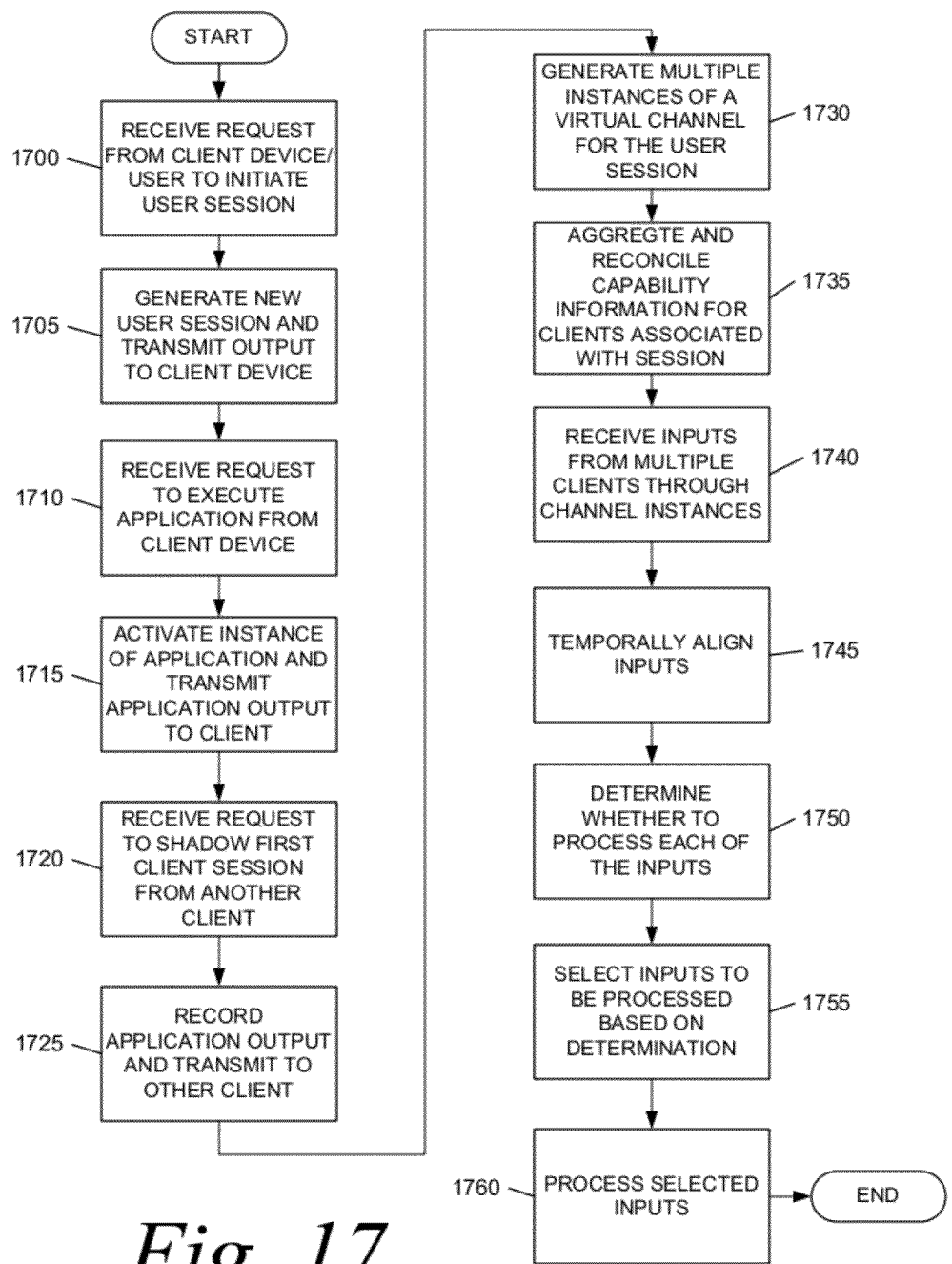
FIG. 17 is a flowchart illustrating an example method for processing touch inputs from multiple clients in a single session or application instance according to one or more aspects described herein.

FIG. 17 illustrates an example process whereby multiple users or devices may collaborate on a single remoted application instance. In step 1700, a remote application server may receive a request from a client device and/or user to initiate a user session. In response to the request, the server may generate a new user session and transmit an output (e.g., a display) to the client device in step 1705. In one example, the initial output upon initiating the new user session may be a desktop. Alternatively or additionally, the output may correspond to commands for activating windows within the client device's operating system and environment. Display data and information may also be transmitted with instructions for displaying the information and data in the activated window or windows. In step 1710, the server may receive a further request to execute an application from the client device and user. In response, the server may activate an instance of the application and transmit application output to the client device in step 1715. The application output may include icons, buttons, menu items, graphics, and other interface elements.

In step 1720, the server may receive a request from another client to shadow the first client's user session or application instance. Upon receiving the request from the other client, the server may begin recording the application output and transmitting the output to the other client in step 1725. In some arrangements, this recording and transmitting process may be performed in real-time or substantially in real-time. In some instances, an artificial delay may be introduced between modifying the application output and transmitting the output to the other device. In other instances, the output may be transmitted as soon as the application is modified and the output is recorded. In step 1730, the server may further generate multiple instances of one or more virtual channels associated with the user or application session. Each instance may correspond to a different one of the client devices sharing the user or application session. For example, the initial user or client device (requesting the user session) may use a first instance of a virtual channel while another user or client device (e.g., the shadower) may user a second instance of a virtual channel. Accordingly, in one example where 3 shadowers request permission to shadow an initial user, 4 instances of a virtual channel may be created, each instance of the virtual channel corresponding to a different one of the group including the shadowers and shadowee. As described, the virtual channel instances may be used to transmit input including touch input, mouse input, key input and the like to the server.

In step 1735, the server may aggregate and reconcile the capabilities for the multiple client devices associated with the user session. For example, the server may request, receive and aggregate the capabilities of each client device shadowing or hosting (e.g., the shadowee) the user session. For example, if the first client device supports two simultaneous touch inputs but the second client device supports ten, then the shared user session environment at the server will report to the hosted applications a virtual digitizer capability of twelve simultaneous touch inputs. Capability information may include a type of input (e.g., a particular type of gesture or set of raw input data) and a corresponding function. Since each client device may have different touch capabilities, the touch input may be interpreted in different ways by the client devices. To address these potentially different interpretations of similar input from different devices, the server may create a mapping table that maps the function to be performed (e.g., stretch, pan, zoom, switch application, close application, minimize application, etc.) to the client device and a type of input received. In some arrangements, the aggregation of device capabilities may be performed upon a client device joining a session for that joining device. Alternatively or additionally, device capabilities may be refreshed or re-aggregated upon each client device joining (e.g., shadowing) the user session. Furthermore, the same or a different mapping may associate/map a client device's touch input identifiers to user session input identifiers (e.g., identifiers unique within the user session) to avoid potential collisions or conflicts between touch inputs received from different devices having the same client-specified input identifier. Furthermore, reconciling multiple client-reported primary touch points may involve considering the first point reported as primary from any client as the de facto primary touch point (e.g., for a particular touch input event or command) in the shared user session. In other examples, the last point reported may be considered the de factor primary touch point. Other rules may be defined for determining the primary touch point (e.g., other time-based rules). A primary touch point may correspond to a first touch point of a multi-touch input event. For example, for a display rotation multi-touch input event, the primary touch point may correspond to a center of the rotational movement.

In step 1740, multiple inputs may be received through the multiple instances of the virtual channel (e.g., at least one input each from two or more channel instances). Upon receipt, the server may begin processing the inputs as described in steps 1745-1760. For example, the server may temporally align the inputs according to a timestamp in step 1745. In one example, the server may identify a time at which the input was received and subtract time differences between each client or user's time and a base time. In one example, the base time may correspond to the shadowee's local time. In other examples, the base time may correspond to a server time. The timestamps may thus be normalized based on subtracting these differences from the receipt time of the input.

In step 1750, the server may determine whether to process each of the multiple inputs. In one example, the server may determine whether the difference in timestamps between two inputs is below a specified threshold. For example, if two inputs are received within 1 second or less of each other, only one of the two inputs may be processed to avoid potential conflicts in modifying the application display or other output, or executing an application functionality. Various thresholds may be used and the threshold applied may depend on the type of input, functionality of the application or resulting modification to the application. For example, zooming an application window may require 2 seconds to complete (e.g., required time for the visual animation). Accordingly, other input received within 2 second of a zoom input may be discarded or otherwise ignored.

If one or more inputs are to be ignored, the server may select inputs to be processed in step 1755. For example, the server may always process the shadowee's inputs over a shadower's input. In another example, the server may process the first input (time-wise) of two or more conflicting inputs. Other rules may, alternatively or additionally, be implemented to resolve conflicts between inputs. In step 1760, the server may subsequently process the received inputs or selected inputs within the context of the application (e.g., to affect a function or display of the application) and transmit the output to the participating devices and users.

According to some aspects, any number (e.g., N number) of user inputs may be received and processed for multiple different applications, application windows, user interface controls, or portions of application displays in parallel. Multiple simultaneous inputs may be received and processed from either the same user or from multiple users. For example, a first user may enter input for a first application (such as a word processing application) while a second user may enter input for a second application (such as a calculator application) for the same user session in parallel. The server or other device executing the applications may then process the received input for each of the applications and return the results (e.g., modification of an application display or desktop) to both the first and second users. Alternatively, a modification of an application display resulting from a user input might only be provided to the user from which the input was received. In some instances, the first and second users may enter input through the same device (e.g., same touch screen of a tablet or other computing device) or may enter input through different devices. Accordingly, in the above example of collaboration through shadowing, users may also enter input into multiple disparate applications rather than interacting with the same application of the user session. In some examples, a single user input may be directed to and processed for multiple applications in parallel. As such, in a particular example, a user may enter an application close command (e.g., a touch or gesture command) for closing multiple applications or application windows. The server may receive the close command and duplicate or otherwise process the command multiple times, once for each of the multiple applications.

The various features described herein may be used in other environments beyond a client device and remote server system. For example, the server may correspond to a phone or tablet while a client may correspond to another tablet or stationary personal computer. Applying the features described herein to such an environment, a user may use a larger display of the other tablet or stationary personal computer or other computing device to operate or control a device (e.g., a phone or tablet or other computing device) having a smaller display. Accordingly, in some examples, the two devices may be local to one another (e.g., in same building, same room) or remote from each other.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Moreover, while many of the aspects and features described herein include the use of a mobile device, stationary or fixed location devices may also include the same or similar aspects and features. For example, a personal computer or workstation (e.g., plugged into a wall socket) may include touch input controls and provide access to a remoted application from a remote computing device. Accordingly, similar native control elements may be generated and used from the personal computer or workstation in similar fashion to a mobile device such as a tablet computer.

Additionally or alternatively, in at least some examples, the methods and features recited herein may be implemented through one or more integrated circuits (ICs). An integrated circuit may, for example, be a microprocessor that accesses programming instructions or other data stored in a read only memory (ROM). In some such examples, the ROM stores programming instructions that cause the IC to perform operations according to one or more of the methods described herein. In at least some other examples, one or more of the methods described herein are hardwired into an IC. In other words, the IC is in such cases an application specific integrated circuit (ASIC) having gates and other logic dedicated to the calculations and other operations described herein. In still other examples, the IC may perform some operations based on execution of programming instructions read from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described systems and methods that are contained within the spirit and scope of the disclosure as set forth in the appended claims. Additionally, numerous other examples, modifications and variations within the scope and spirit of the appended claims will occur to persons of ordinary skill in the art from a review of this disclosure.

I claim:

1. A method comprising:
receiving, by a first computing device, an indication of touch input from a second computing device different from the first computing device, wherein the touch input is directed to an application executing on the first computing device;
generating, by the first computing device, a touch input notification message in a first message format configured to trigger a first type of function call by the application executing on the first computing device for processing the touch input, wherein the function call causes execution by the application executing on the first computing device of a function that processes the touch input;
forwarding, by the first computing device, the touch input notification message to the application executing on the first computing device; and
receiving, by the first computing device, an indication of a second touch input from the second computing device, the second touch input directed to a second application executing on the first computing device, wherein the touch input directed to the application and the second touch input directed to the second application are a same type of touch input,
wherein the second application interprets the second touch input differently than the application interprets the touch input.

2. The method of claim 1, comprising:
receiving, by the first computing device, device capability information of the second device, wherein the device capability information includes input capabilities of the second device.

3. The method of claim 1, comprising:
generating a touch input event at the first computing device using a driver configured to generate touch input events in an operating system of the first computing device, wherein the driver executes as part of the operating system.

4. The method of claim 1, comprising:
executing a function provided by an operating system of the first computing device to generate a touch input event corresponding to the indication of touch input.

5. The method of claim 1, comprising:
detecting, by the first computing device, initiation of the first type of function call by the application to process the touch input; and
in response to detecting initiation of the first type of function call, replacing the first type of function call with a second type of function call different from the first type of function call.

6. The method of claim 5, comprising:
processing the touch input using the second type of function call, wherein the second type of function call is configured to provide data for the touch input.

7. The method of claim 5, wherein the first type of function call is provided by an operating system.

8. The method of claim 5, wherein executing the second type of function call includes:
determining a type of application corresponding to the application; and
generating one or more touch-input commands based on the determined type of application.

9. The method of claim 5, wherein executing the second type of function call comprises:
determining a type of operating system executing on at least one of: the first computing device and second computing device; and
generating one or more touch-input commands based on the determined type of operating system executing on the at least one of: the first computing device and second computing device.

10. The method of claim 5, wherein the touch input includes coordinates, and wherein the method comprises:
modifying the coordinates based on specified translation values.

11. The method of claim 5, wherein the first type of function call is configured to use kernel memory and the second type of function call is configured to use non-kernel memory.

12. The method of claim 1, comprising:
retrieving raw input data corresponding to the touch input;
determining a type of touch input information to provide the application, wherein the type of touch input information includes one of: the raw input data and one or more commands; and
if the type of touch input information includes the one or more commands, generating the one or more commands based on the raw input data,
otherwise, providing the raw input data to the application.

13. The method of claim 1, comprising:
retrieving data for the touch input;
processing the touch input into one or more touch-input commands; and
executing the one or more touch-input commands.

14. The method of claim 13, wherein executing the one or more touch-input commands results in a modification of an appearance of a display of the application, and wherein the method comprises:
transmitting the modification of the appearance of the display of the application to the second computing device.

15. The method of claim 1, wherein the application and the second application respectively define how to interpret a type of touch input.

16. A method comprising:
receiving, by a first computing device, a message comprising touch input from a second computing device different from the first computing device, wherein the touch input is directed to an application executing on the first computing device;
generating, by the first computing device, a touch input notification message in a first message format configured to trigger a first type of function call by the application executing on the first computing device for processing the touch input, wherein the function call causes execution by the application executing on the first computing device of a function that processes the touch input;
forwarding the touch input notification message to the application executing on the first computing device;
storing, by the first computing device, the touch input in a shared memory space;
associating the shared memory space with a private address; and sending a second notification message to the application, wherein the second notification message comprises the private address.

17. The method of claim 16, wherein the forwarded touch input notification message is blocked by an operating system of the first computing device, and the second notification message comprising the private address is allowed by the operating system of the first computing device.

18. A method comprising:
- receiving, by a first computing device, a message comprising touch input from a second computing device different from the first computing device, wherein the touch input is directed to an application executing on the first computing device;
- generating, by the first computing device, a touch input notification message in a first message format configured to trigger a first type of function call by the application executing on the first computing device for processing the touch input, wherein the function call causes execution by the application executing on the first computing device of a function that processes the touch input;
- forwarding, by the first computing device, the touch input notification message to the application executing on the first computing device;
- receiving, by the first computing device, a second message comprising second touch input from a third computing device different from the first computing device and the second computing device, wherein the second touch input is directed to the application executing on the first computing device;
- detecting that the second touch input from the third computing device conflicts with the touch input from the second computing device; and
- discarding the second touch input from the third computing device.

19. One or more non-transitory computer-readable media storing computer-readable instructions that, when executed, cause an apparatus to:
- receive a message comprising touch input from a computing device different from the apparatus, wherein the touch input is directed to an application executing on the apparatus;
- generate a touch input notification message in a first message format configured to trigger a function call by the application for processing the touch input;
- forward the touch input notification message to the application; and
- execute, in response to the function call by the application, a function that replays, by the apparatus, the touch input for the application, wherein an operating system of the apparatus blocks the touch input received from the computing device, and allows the function that replays, by the apparatus, the touch input for the application.

* * * * *